United States Patent
Lintz

(10) Patent No.: US 11,308,159 B2
(45) Date of Patent: Apr. 19, 2022

(54) DYNAMIC DETECTION OF CUSTOM LINEAR VIDEO CLIP BOUNDARIES

(71) Applicant: Comcast Cable Communications, LLC, Philadelphia, PA (US)

(72) Inventor: Christopher Lintz, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 306 days.

(21) Appl. No.: 16/047,939

(22) Filed: Jul. 27, 2018

(65) Prior Publication Data

US 2019/0034528 A1  Jan. 31, 2019

Related U.S. Application Data

(60) Provisional application No. 62/538,464, filed on Jul. 28, 2017.

(51) Int. Cl.
| | |
|---|---|
| *G06F 16/78* | (2019.01) |
| *G06F 16/73* | (2019.01) |
| *G06F 16/74* | (2019.01) |
| *G06F 16/738* | (2019.01) |

(52) U.S. Cl.
CPC ............. *G06F 16/78* (2019.01); *G06F 16/73* (2019.01); *G06F 16/739* (2019.01); *G06F 16/745* (2019.01)

(58) Field of Classification Search
CPC .......... G06F 16/78; G06F 16/40; G06F 16/50; G06F 16/532
USPC ................................................. 707/758, 706
See application file for complete search history.

(56) References Cited

U.S. PATENT DOCUMENTS

| | | | |
|---|---|---|---|
| 2015/0234862 A1* | 8/2015 | Patil ........................ | G06F 16/14 707/706 |
| 2015/0319510 A1* | 11/2015 | Ould Dellahy, VIII et al. ............ | H04N 21/4725 725/32 |
| 2019/0034528 A1* | 1/2019 | Lintz ..................... | G06F 16/745 |

* cited by examiner

*Primary Examiner* — Hung T Vy
(74) *Attorney, Agent, or Firm* — Ballard Sparh LLP

(57) ABSTRACT

Described herein are systems and methods for generating a video clip. The video clip may be generated based on applying a query to content metadata to identify a match within a content item. A start boundary and an end boundary for the video clip are determined based on the match(es).

20 Claims, 18 Drawing Sheets

FIG. 6

```
{
    "program": "Mad Money",
    "streamName": "CNBC HD",
    "streamId": "8951620516683951163",
    "ebpTime": 1496438204,
    "test": >> Tesla passes Ford in market value now up over $350 per share
            as it continues an unreal run ahead of the Model S",
    "shotChange": [1496438204, 1496438208],
    "sceneChange": [1496438212]
}
```

FIG. 13

[1498423117] Ford's market value has just been passed by <b>Tesla</b> as the stock breaks through $350 a share. [1498423121] The first deliveries are expected in late July for the Model 3.

DYNAMIC DETECTION OF CUSTOM LINEAR VIDEO CLIP BOUNDARIES

CROSS REFERENCE TO RELATED PATENT APPLICATION

This application claims priority to U.S. Provisional Application No. 62/538,464 filed Jul. 28, 2017, herein incorporated by reference in its entirety.

BACKGROUND

Content search functionalities are limited. A user that desires to search content, both linear and non-linear, in a similar fashion to searching the Internet has no viable option to do so. Conventional systems provide limited search functionality and no ability to generate a video clip of relevant content based on user queries. Any content that matches a user query will result in, at best, an identification of a point in content where the user query matches and, at worst, an identification of a content item that contains the query match somewhere. These and other shortcomings are addressed by the approaches set forth herein.

SUMMARY

It is to be understood that both the following general description and the following detailed description are exemplary and explanatory only and are not restrictive. Provided are methods and systems for searching content and generating a video clip inclusive of content matching the search. A query may be received. The query may comprise one or more search terms and/or phrases. Content metadata may be searched to identify an occurrence of the one or more search terms and/or phrases. The content metadata may be linear content metadata. Linear content metadata may be metadata generated/received as linear content is streamed/received. Upon identifying an occurrence of the one or more search terms and/or phrases, a start boundary may be set as a first duration preceding the occurrence. The start boundary may be a content transition nearest the first duration (e.g., a shot change, a scene change, etc. . . . ). Upon identifying another occurrence of any of the one or more search terms, an end boundary may be set a second duration preceding the occurrence. The end boundary may be a content transition nearest the second duration (e.g., a shot change, a scene change, etc. . . . ). A video clip may be generated based on the start and end boundaries. In an example, the query is run against linear content metadata generated/received as content is received. The end boundary may be extended based one on or more subsequent occurrences of any of the one or more search terms. As another example, the segment can be based upon signals within the content stream. For example, the content may be encoded with signals (e.g., using the SCTE-35 standard) that indicate changes in the content, such as scene changes. These scene changes may be used to determine the start and end boundary.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 6 is example content metadata;

FIG. 13 represents a search result from the query "Tesla" against a program transcript document;

DETAILED DESCRIPTION

Figure 1:
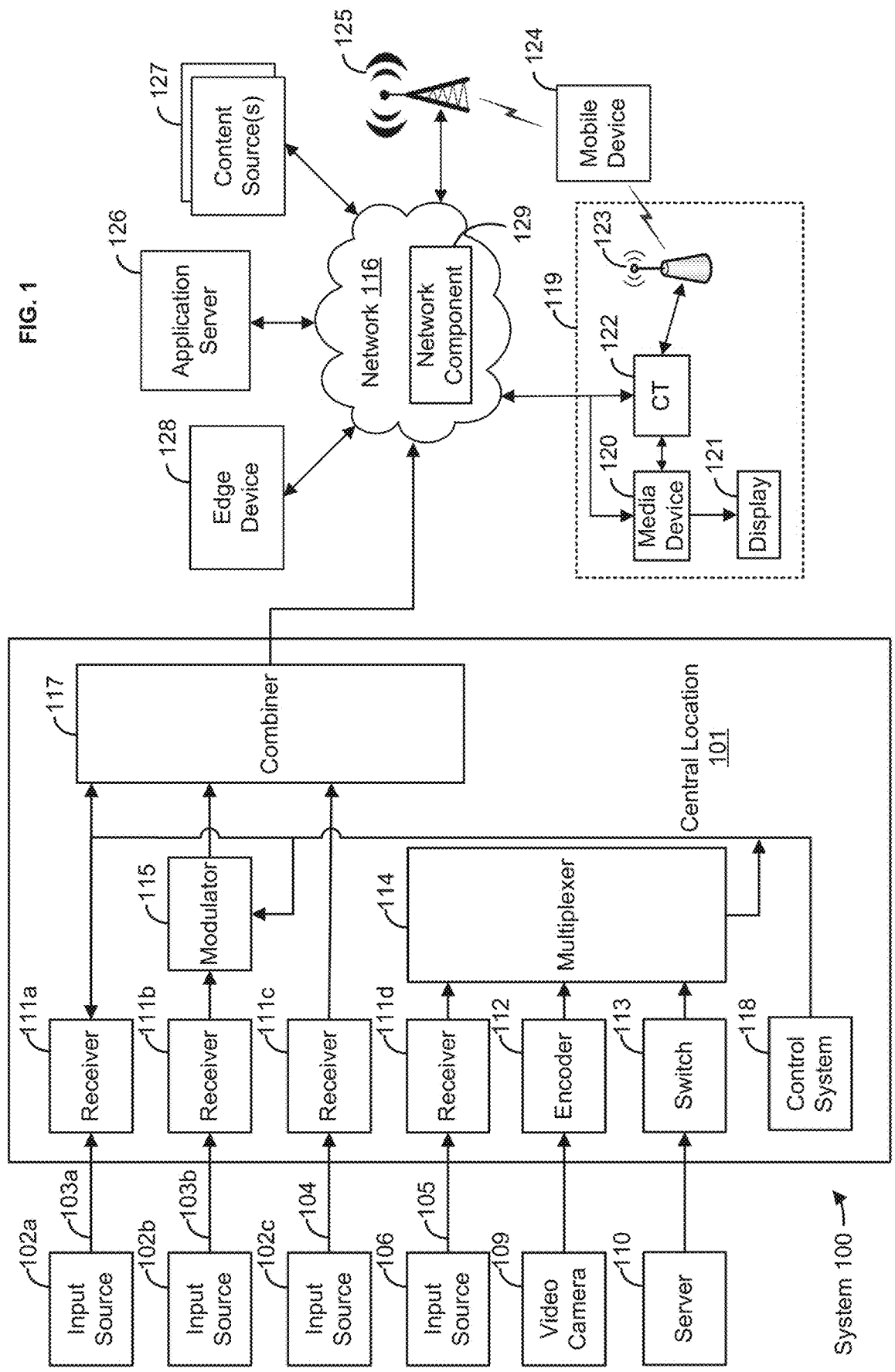
FIG. 1 is a diagram of an example content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutation of these may not be explicitly disclosed, each is specifically contemplated and described herein, for all methods and systems. This applies to all examples of this application including, but not limited to, steps in the described methods. Thus, if there are a variety of additional steps that may be performed it is understood that each of these additional steps may be performed with any specific embodiment or combination of embodiments of the described methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware examples. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

In various examples, this detailed description may refer to video clips or content items (which may also be referred to as "content," "content data," "content information," "content asset," "multimedia asset data file," or simply "data" or "information"). In some examples, video clips or content items may comprise any information or data that may be licensed to one or more individuals (or other entities, such as business or group). In various examples, video clips or content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4K, Adobe® Flash® Video (.FLV) format or some other video file format whether such format is presently known or developed in the future. In various examples, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, video clips or content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some examples, content items may include any combination of the above-described examples.

Described herein are various examples that may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various examples this detailed disclosure may refer to a given entity performing some action. It should be understood that this language may in some cases mean that a system (e.g., a computer) owned and/or controlled by the given entity is actually performing the action.

Described herein are systems and methods for dynamically determining boundaries for a video clip within an item of content. In an example, a query may be received. The query may comprise one or more search terms and/or phrases. Upon identifying an occurrence of the one or more search terms and/or phrases (or at least one of the one or more search terms), a start boundary may be set for a first duration preceding the occurrence. The start boundary may be a content transition nearest the first duration (e.g., a shot change, a scene change, etc. . . . ). Upon identifying another occurrence of the one or more search terms (or at least one of the one or more search terms), an end boundary may be set for a second duration preceding the occurrence. The end boundary may be a content transition nearest the second duration (e.g., a shot change, a scene change, etc. . . . ). A video clip may be generated based on the start and end boundaries. In an example, the query is run against linear content metadata generated/received as content is received. The end boundary may be extended based one on or more subsequent occurrences of any of the one or more search terms. As another example, the segment can be based upon signals within the content stream. For example, the content may be encoded with signals (e.g., using the SCTE-35 standard) that indicate changes in the content, such as scene changes. These scene changes may be used to determine the start and end boundary.

In another example, two or more search terms may be received (e.g., search term 1 and search term 2). A first occurring scene boundary in an item of content may be set as a start boundary based on the occurrence of search term 1 or search term 2. If both search term 1 and search term 2 occur before the next shot/scene boundary, the next shot/scene boundary may be set as an end boundary. If only search term 1 or search term 2 occur before the next scene boundary, the search may continue until another scene boundary occurrence of search term 1 or search term 2 is found.

FIG. 1 shows an example system in which the present methods and systems may operate. Those skilled in the art will appreciate that present methods may be used in systems that employ both digital and analog equipment. One skilled in the art will appreciate that provided herein is a functional description and that the respective functions may be performed by software, hardware, or a combination of software and hardware.

A system 100 may comprise a central location 101 (e.g., a headend), which may receive content (e.g., data, input programming, and the like) from multiple sources. The central location 101 may combine the content from the various sources and may distribute the content to user (e.g., subscriber) locations (e.g., location 119) via a distribution system 116.

In an example, the central location 101 may receive content from a variety of sources 102a, 102b, 102c. The content may be transmitted from the source to the central location 101 via a variety of transmission paths, including wireless (e.g. satellite paths 103a, 103b) and a terrestrial path 104. The central location 101 may also receive content from a direct feed source 106 via a direct line 105. Other input sources may comprise capture devices such as a video camera 109 or a server 110. The signals provided by the content sources may include a single content item or a multiplex that includes several content items.

The central location 101 may comprise one or a plurality of receivers 111a, 111b, 111c, 111d that are each associated with an input source. For example, MPEG encoders such as an encoder 112, are included for encoding local content or a video camera 109 feed. A switch 113 may provide access to the server 110, which may be a Pay-Per-View server, a data server, an internet router, a network system, a phone system, and the like. Some signals may require additional processing, such as signal multiplexing, prior to being modulated. Such multiplexing may be performed by a multiplexer (mux) 114.

The central location 101 may comprise one or a plurality of modulators 115 for interfacing to a network 116. The modulators 115 may convert the received content into a modulated output signal suitable for transmission over a network 116. The output signals from the modulators 115 may be combined, using equipment such as a combiner 117, for input into the network 116. In an example, the network 116 may comprise a content delivery network, a content access network, and/or the like. For example, the network 116 may be configured to provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of the system 100. The control system 118 may interface, monitor, and/or control a variety of functions, including, but not limited to, the channel lineup for the television system, billing for each user, conditional access for content distributed to users, and the like. The control system 118 may provide input to the modulators for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an example, a multitude of users may be connected to the network 116 at one or more of the user locations. At the user location 119, a media device 120 may demodulate and/or decode, if needed, the signals for display on a display device 121, such as on a television set (TV) or a computer monitor. For example, the media device 120 may comprise a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may comprise a set-top box, a digital streaming device, a gaming device, a media storage device, a digital recording device, a combination thereof, and/or the like. The media device 120 may comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or satellite dish.

In an example, the communication terminal 122 may be located at the user location 119. The communication terminal 122 may be configured to communicate with the network 116. The communications terminal 122 may comprise a modem (e.g., cable modem), a router, a gateway, a switch, a network terminal (e.g., optical network unit), and/or the like. The communications terminal 122 may be configured for communication with the network 116 via a variety of protocols, such as internet protocol, transmission control protocol, file transfer protocol, session initiation protocol, voice over internet protocol, and/or the like. For example, for a cable network, the communication terminal 122 may be configured to provide network access via a variety of communication protocols and standards, such as Data Over Cable Service Interface Specification.

In an example, the user location 119 may comprise a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). For example, the first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

In an example, the user location 119 may not be fixed. By way of example, a user may receive content from the network 116 on the mobile device 124. The mobile device 124 may comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). For example, the mobile device 124 may communicate with a second access point 125. The second access point 125 may be a cell tower, a wireless hotspot, another mobile device, and/or other remote access point. The second access point 125 may be within range of the user location 119 or remote from the user location 119. For example, the second access point 125 may be located along a travel route, within a business or residence, or other useful locations (e.g., travel stop, city center, park).

In an example, the system 100 may comprise an application device 126. The application device 126 may be a computing device, such as a server. The application device 126 may provide services related to applications. For example, the application device 126 may comprise an application store. The application store may be configured to allow users to purchase, download, install, upgrade, and/or otherwise manage applications. For example, the application device 126 may be configured to allow users to download applications to a device, such as the mobile device 124, communications terminal 122, the media device 120, the display device 121, and/or the like. The application device 126 may run one or more application services to provide data, handle requests, and/or otherwise facilitate operation of applications for the user.

In an example, the system 100 may comprise one or more content source(s) 127. The content source(s) 127 may be configured to provide content (e.g., video, audio, games, applications, data) to the user. The content source(s) 127 may be configured to provide streaming media, such as on-demand content (e.g., video on-demand), content recordings, and/or the like. For example, the content source(s) 127 may be managed by third party content providers, service providers, online content providers, over-the-top content providers, and/or the like. The content may be provided via a subscription, by individual item purchase or rental, and/or the like. The content source(s) 127 may be configured to provide the content via a packet switched network path, such as via an internet protocol (IP) based connection. In an example, the content may be accessed by users via applications, such as mobile applications, television applications, set-top box applications, gaming device applications, and/or the like. An example application may be a custom application (e.g., by content provider, for a specific device), a general content browser (e.g., web browser), an electronic program guide, and/or the like.

In an example, the system 100 may comprise an edge device 128. The edge device 128 may be configured to provide content, services, and/or the like to the user location 119. For example, the edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device such as the media device 120 or other user device), provide the user a manifest file (e.g., or other index file describing segments of the content), provide streaming content (e.g., unicast, multicast), provide a file transfer, and/or the like. The edge device 128 may cache or otherwise store content (e.g., frequently requested content) to enable faster delivery of content to users.

A component of the system, e.g., the edge device 128, may receive a query. The query may correspond to a user associated with a user device to which content is being transmitted. For example, the query may comprise a voice query provided to a set top box or other user device to which content is being transmitted. As another example, the query may comprise a voice query provided to a control device, e.g., a remote control, of the set top box. As a further example, the query may comprise a voice query provided to a computing device configured to listen for ambient trigger keywords in order to initiate reception of the voice query. In yet another example, the query may comprise a text query transmitted by a user device, e.g., a mobile device, remote control, keypad, etc. . . . The query may comprise one or more keywords and/or phrases. The query may comprise a plurality of keywords and/or phrases. For example, a query may comprise "Donald Trump" and "healthcare."

The edge device 128 may determine if the one or more matching keywords and/or phrases exists in metadata associated with any number of linear content streams. In an example, in response to receiving the query, the edge device 128 may determine if the one or more matching keywords and/or phrases exists in metadata associated with any number of linear content streams. In another example, in response to receiving the query, the edge device 128 may determine what content item is being transmitted to, or otherwise consumed by, the media device 120. The content item may be a pre-recorded content item, a linear content item, a "live" content item, and the like. For example, the content item may be a linear content item that is being recorded and/or stored as it is consumed. Determining what content item is being transmitted to, or otherwise consumed by, the media device 120 may include accessing request logs, transmissions, or other data associated with the media device 120 that may identify the content. Determining what content item is being transmitted to the media device 120 may also include transmitting a request to the user device to identify the content.

The edge device 128 may determine if the one or more matching keywords and/or phrases exists in metadata associated with the content item and/or any available linear content stream. In an example, in response to receiving the query, the edge device 128 may determine if the one or more matching keywords and/or phrases exists in metadata associated with the content item and/or any available linear content stream. The edge device 128 may use an identifier of the content item and/or any available linear content stream to access the metadata associated with the content item and/or any available linear content stream. The edge device 128 may treat the query as a traditional search statement wherein the entirety of the statement must be present in the metadata to initiate a process of identifying boundaries for a video clip. The edge device 128 may tokenize the query and separate the query out into portions and once at least one of the portions of the query is present in the metadata a process of identifying boundaries for a video clip may be initiated. The edge device 128 may treat the query as both a traditional search statement and a tokenized query. For example, the edge device 128 may treat the query as a traditional search statement to initially identify a content item for further search via tokenized query.

The edge device 128 may include Natural Language Processing (NLP) in order to process the query. For example, the edge device 128 can use the NLP to determine terms that are logically associated with the query to broaden the search. As an example, a search for "Trump" may include other terms such as "President," "POTUS," "Donald", "Donald Trump," and so forth such that edge device 128 can search for terms that are logically associated with the term "Trump." As another example, the edge device 128 may include Query Expansion (QE). In an example, QE evaluates a search term and expands the search query. For example, QE may determine synonyms of words in the search and then search for the synonyms, fix spelling errors, determine any other spellings of the words in the search, and so forth to expand the query beyond the literal search terms.

By way of example, the metadata may be linear metadata. The linear metadata may comprise one or more of, dialogue data, shot change data, scene change data, advertisement break data, social metadata, combinations thereof, and the like. Dialogue data may be, for example, closed captioning data and/or speech-to-text data). Shot change data may represent shot boundaries within the content item. Shot boundaries are points of non-continuity in the video, e.g., associated with a change in a camera angle or scene. Shot change data may be detected by video analysis. A shot change may also represent a start or end of commercial. Scene change data may represent a start or end of a scene. Scene change data may be detected by video analysis. A scene change may also represent a start or end of commercial. Advertisement break data may represent a start or end of an advertisement and/or group of advertisements. Advertisement break data may be detected by video analysis or may be signaled within closed captioning data and/or a manifest). Social metadata may comprise communications from users of a social platform such as Tweets, posts, comments, etc. . . . . Any and/or all the metadata described above may comprise timestamps within the program start and program end time. The timestamps may be presentation timestamp (PTS), encoder boundary point (EBP), a Unix timestamp, and the like.

In the case of a linear content item, as the edge device 128 receives the linear metadata (e.g., in near real-time), the linear metadata may be stored in-memory for the duration of the linear content item (or longer) and searched against by the query. Linear metadata is also referred to herein as a program metadata document. Storing the linear metadata for at least the duration of the linear content item allows late arriving queries to find matches all throughout the linear content item that has passed, as well as in real-time. It also allows for more complicated queries, for example, proximity queries and/or conjunction/disjunction queries. In an example, the edge device 128 may generate the linear metadata from one or more content streams as the one or more content streams are received. The edge device 128 may be configured to extract closed caption data from the one or more content streams along with associated timestamps. The edge device 128 may be configured to determine one or more content transitions, by for example, accessing one or more manifest files and determining advertisement break data. A content transition may be, for example, a shot change (also referred to as a shot boundary), a scene change (also referred to as a scene boundary), a combination thereof, and the like. The edge device 128 may further determine content transitions through video analysis as described herein. The edge device 128 may further generate a program transcript document by extracting dialogue data, timestamps, and content transition data from the linear metadata and appending the dialogue data, the timestamps, and the content transition data to a program transcript document. The program transcript document may be maintained for any length of time.

Next, the edge device 128 may determine a start boundary and an end boundary of a video clip associated with one or more matches found in the metadata. The edge device 128 may determine one or more content transitions before and/or after a time of a query match. For example, previous transitions may be stored in a memory associated with the edge device 128, and new content transitions may be determined while the edge device 128 receives the content streams. For example, the edge device 128 may store the content transitions in a content transition timeline. The content transition timeline may comprise any suitable data structure. In an example, the edge device 128 may set a first occurring scene boundary as an initial temporary boundary. The edge device 128 may then determine whether the initial temporary boundary is a true boundary. For example, in the event that both keywords and/or phrases occur before the next scene boundary, the initial temporary boundary may be confirmed as a true boundary. If only one of the keywords and/or phrases occur before the next scene boundary, the next scene boundary may be set as the initial temporary boundary. In an example, the initial boundary is not a temporary boundary. Rather, the initial boundary is immediately treated like the true boundary without the need for confirmation.

In another example, once the edge device 128 identifies a match, a start boundary may be set by subtracting a predetermined first duration from a timestamp associated with the match and determining a shot change or a scene change closest in time to that resulting time point. The predetermined first duration may be a desired duration representing the minimum amount of video desired before a match occurs. For example, 10 seconds, 20 seconds, 30 seconds, 1 minute, 3 minutes, 5 minutes, etc. . . . . The determined shot change or scene change may then be set as the start boundary. If no shot changes or scene changes exist between the timestamp associated with the match and a start time of the linear content item, then the start time of the linear content item may be set as the start boundary. An end boundary may be set by adding a predetermined second duration to the timestamp associated with the match and determining a shot change or a scene change closest in time to that resulting time point. The predetermined second duration may be a desired duration representing the minimal amount of video desired after a match occurs. For example, 10 seconds, 20 seconds, 30 seconds, 1 minute, 3 minutes, 5 minutes, etc. In another example, the second duration may represent a duration that results in a minimum video clip duration. For example, if a minimum video clip duration is 10 minutes, and the first duration causes a start boundary to be established 5 minutes from the match, then the predetermined second duration would be 5 minutes to achieve the minimum video clip duration of 10 minutes. In one example, once the determined duration has passed, the next shot change or scene change may then be set as the end boundary. In an example, the time point resulting from the addition of the predetermined second duration to the timestamp associated with the match may be set as the end boundary. If the end time of the linear content item is between the timestamp and the predetermined second duration, then the end time of the linear content item may be set as the end boundary. As linear metadata is generated/received, the edge device 128 may extend the end boundary incrementally as more matches are found. A predetermined third duration may be used as an incremental amount to extend a previously calculated end boundary. For example, 10 seconds, 20 seconds, 30 seconds, 1 minute, 3 minutes, 5 minutes, etc.

In another example, the edge device 128 may identify a first occurrence of a match. In some examples, identifying the first occurrence of the match may be performed after a content item and/or linear content stream has been identified as having content metadata comprising the entirety of the query. A first occurrence of a match may be, for example, a first instance of a first portion of a multi-portion query. In a query such as, "Donald Trump" and "healthcare," the first instance of the first portion ("Donald Trump") in the metadata will result in a first occurrence of a match. Relatedly, a second occurrence of a match may be, for example, a second instance of a second portion of the multi-portion query. As another example, the first instance of the second portion ("healthcare") in the metadata may be a second occurrence of a match. More than two occurrences of matches are contemplated. In another example, the first instance of either the first or second portions of the multi-portion query may be a first occurrence of a match and any subsequent instance of either the first or second portions of the multi-portion query may be a second, or subsequent, occurrence of a match. As a further example, a match may only occur when both "Donald Trump" and "healthcare" are within a predetermined length of time (e.g., a segment) of each other. In this example, a single occurrence of "Donald Trump" without an occurrence of "healthcare" within the same length of time would not result in a match with the query. That is, if "Donald Trump" does not occur within a length of time from "healthcare," or vice versa, then there would not be a match.

Once the edge device 128 identifies a first occurrence of a match, a start boundary may be set by subtracting a predetermined first duration from a timestamp associated with the first occurrence of the match and determining a shot change or a scene change closest in time to that resulting time point. The predetermined first duration may be a desired duration representing the minimal amount of video desired before a match occurs. For example, 10 seconds, 20 seconds, 30 seconds, 1 minute, 3 minutes, 5 minutes, etc. . . . . The determined shot change or scene change may then be set as the start boundary. If no shot changes or scene changes exist between the timestamp associated with the first occurrence of the match and a start time of the linear content item, then the start time of the linear content item may be set as the start boundary. An end boundary may be set by adding a predetermined second duration to the timestamp associated with the first occurrence of the match and determining a shot change or a scene change closest in time to that resulting time point. The predetermined second duration may be a desired duration representing the minimal amount of video desired after a match occurs. For example, 10 seconds, 20 seconds, 30 seconds, 1 minute, 3 minutes, 5 minutes, etc. In one example, once the determined duration has passed, the next shot change or scene change may then be set as the end boundary. In an example, the time point resulting from the addition of the predetermined second duration to the timestamp associated with the first occurrence of the match may be set as the end boundary. If the end time of the linear content item is between the timestamp and the predetermined second duration, then the end time of the linear content item may be set as the end boundary. As new linear metadata is received, the end boundary may be extended. The new linear metadata may be queried and a second occurrence of a match may be identified. A predetermined third duration may be added to a time stamp associated with the second occurrence of the match and determining a shot change or a scene change closest in time to that resulting time point. A predetermined third duration may be a duration representing an incremental amount to extend a previously calculated end boundary. For example, 10 seconds, 20 seconds, 30 seconds, 1 minute, 3 minutes, 5 minutes, etc. . . . . The determined shot change or scene change may then be set as the end boundary. In an example, the time point resulting from the addition of the predetermined third duration to the timestamp associated with the second occurrence of the match may be set as the end boundary. If the end time of the linear content item is between the timestamp and the predetermined third duration, then the end time of the linear content item may be set as the end boundary. For each subsequent occurrence of a match, the end boundary may be extended by the predetermined third duration, to a shot change/scene change closest to a time point resulting from adding the predetermined third duration to a timestamp of the subsequent occurrence, or the end of the linear content item.

The edge device 128 may extract a portion of the content item (e.g., a video clip), based on the start boundary and the end boundary. The portion of the content item may be extracted and stored as a separate content item or a data structure may be stored containing an identifier of the content item along with the start boundary and the end boundary so that the content item may be later retrieved and started at the start boundary and ended at the end boundary. The portion of the content item may then be transmitted to the media device 120 or other user device.

In an example, the network 116 may comprise a network component 129. The network component 129 may comprise any device, module, and/or the like communicatively coupled to the network 116. The network component 129 may comprise a router, a switch, a splitter, a packager, a gateway, an encoder, a storage device, a multiplexer, a network access location (e.g., tap), physical link, and/or the like. Some or all examples of the methods described herein may be performed via the network component 129.

Figure 2:
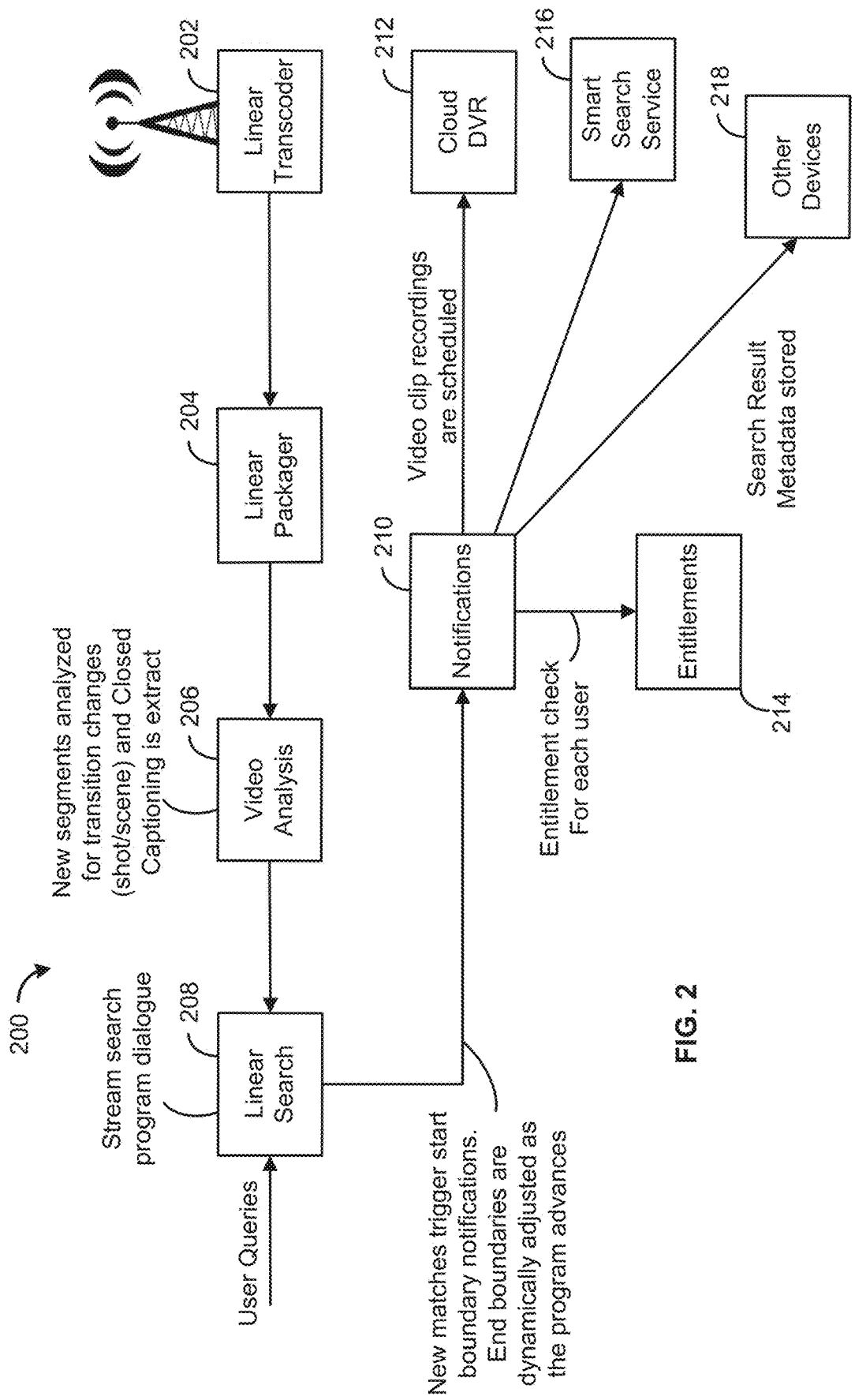
FIG. 2 is an example linear search and video analysis environment.

FIG. 2 shows an example linear search and record architecture 200. One or more of the components shown in FIG. 2 may be the edge device 128 of FIG. 1, the network component 129 of FIG. 1, combinations thereof, and the like. A linear transcoder 202 may receive content from a content source (not shown) and transcode the received content from one format to another format. The linear transcoder 202 may transcode received content into an MPEG-2 transport stream and deliver the content via UDP to a linear packager 204. The linear packager 204 may segment the content received from the linear transcoder 202 and encapsulate the content segments in a container expected by a particular type of adaptive bit rate client. Thus, a whole video may be segmented in to what is commonly referred to as content segments. The linear packager 204 may create and deliver manifest files. The linear packager 204 creates the manifest files as the linear packager 204 performs the segmenting operation for each type of adaptive bit rate streaming method. As an example, the manifest files may be Dynamic Adaptive Streaming over HTTP ("DASH"). In adaptive bit rate protocols, the manifest files generated may include a variant playlist and a playlist file. The variant playlist describes the various formats (resolution, bit rate, codec, etc.) that are available for a given asset or content stream. For each format, a corresponding playlist file may be provided. The playlist file identifies the content fragments that are available to the client. It is noted that the terms manifest files and playlist files may be referred to interchangeably herein. A client determines which format the client desires, as listed in the variant playlist, finds the corresponding manifest/playlist file name and location, and then retrieves content segments referenced in the manifest/playlist file.

The packager creates the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

The linear packager 204 may provide the content segments and the manifest file(s) to a video analysis component 206. For example, as an MPEG-4 transport stream via HTTP. As another example, the video may be provide as HTTP delivery of a DASH manifest and the segments are wrapped in MPEG transport streams. The video analysis component 206 may monitor received content segments and/or received manifest to access content segments for analysis. The video analysis component 206 may generate program metadata documents, program transcript documents, and the like. A content segment may be analyzed for shot changes and scene changes. The video analysis component 206 may extract closed captioning data and perform a speech-to-text function as needed. Functionality of the video analysis component 206 is further described with regard to FIG. 5 and FIG. 6. The video analysis component 206 may store, or cause storage of, program metadata documents, program transcript documents, and the like.

A linear search component 208 may receive a query from a user device, such as the media device 120 of FIG. 1. The linear search component 208 may attempt to match the query to the closed captioning data and/or speech-to-text data to identify one or more matches. The linear search component 208 may generate match metadata (e.g., a content identifier, a location of the match, a start boundary, an end boundary, or a combination thereof), content transition timelines, and the like. The linear search component 208 may store, or cause storage of, the match metadata, the content transition timelines, and the like. A first occurrence of a match enables identification of a start boundary that precedes the first occurrence and new matches are identified as the content advances. Subsequent matches enable identification of an end boundary that may be dynamically adjusted as the content advances. The linear search component 208, upon identifying a start boundary and an end boundary, may provide data such as a content identifier, the start boundary, the end boundary, or a combination thereof, to a notification component 210.

The notification component 210 may cause a cloud DVR 212 to extract a portion of the content (e.g., a video clip) and store the portion of the content for later viewing. The notification component 210 may cause a cloud DVR 212 to store the content and store data indicative of the start boundary and the end boundary to enable viewing of the portion of the content (e.g., a video clip) without requiring video extraction. The entirety of the content (e.g., news program) may be provided to a user along with the data indicative of the start boundary and the end boundary. One or more of the cloud DVR and/or the media device 120 may be configured to treat the start boundary and the end boundary as program start and end times, effectively limiting viewing of the content to the portion between the start and end boundaries.

The notification component 210 may request an entitlement component 214 to perform an entitlement check for a user account associated with the query prior to initiating a recording and/or storage of the portion of the content (e.g., by the cloud DVR 212) to ensure the user account has appropriate access rights to view the content. This provides a broad based search across all available linear streams and allows users to be notified that content of interest is appearing on a stream—even if the user is not yet entitled to the stream. The notification component 210 may send a notification to smart search service 216 to incorporate the search with other devices. For example, the smart search service 216 may include a smart device that is in communication with other devices within the user's home. The smart search service 216 may provide information to the other devices within the user's home to improve the functioning of the other devices. As an example, if the notification indicated the user was interested in weather, the smart search service 216 may indicate to other devices to provide the weather for the user. The notification component 210 may also send a notification to other devices 218. The other devices may include appliances of the user, a smart device associated with the user, a computer, a laptop, and so forth.

Figure 3:
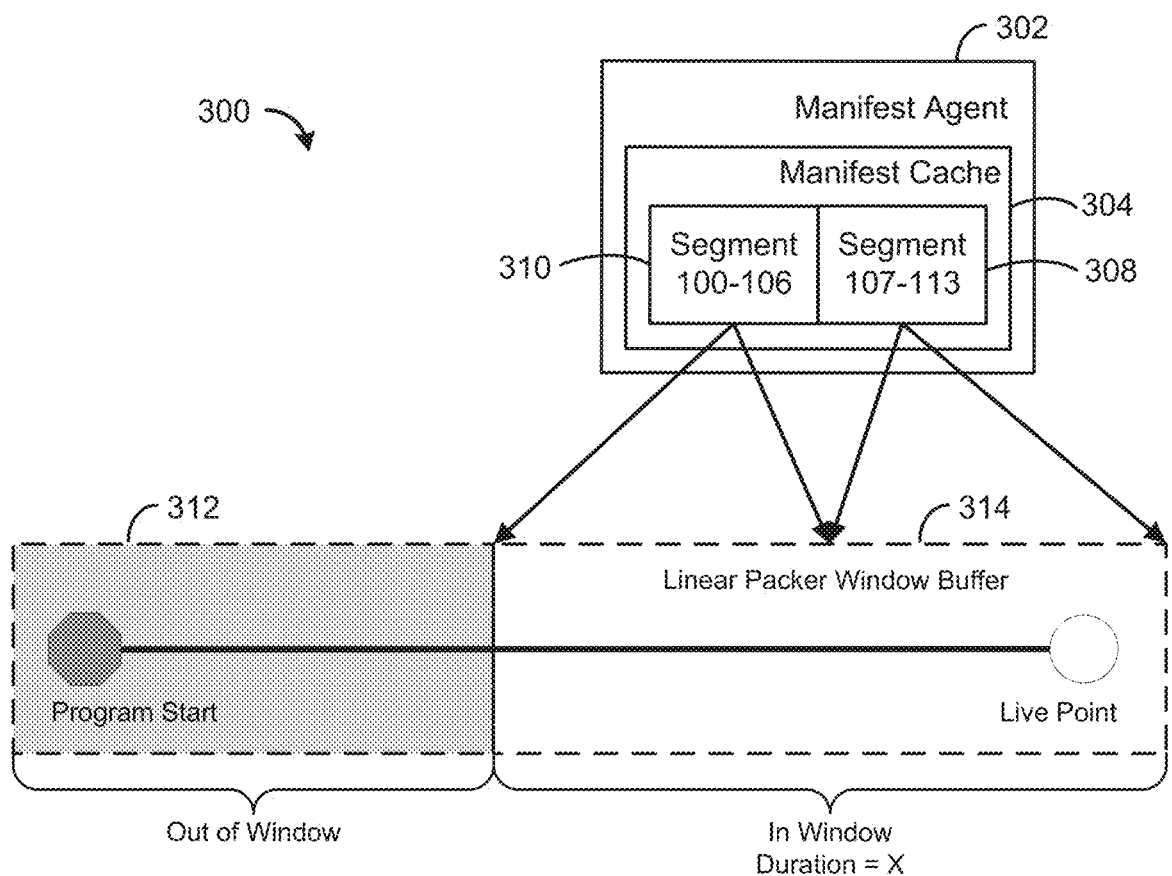
FIG. 3 is an example manifest agent of a cloud DVR.

The cloud DVR 212 may comprise one or more manifest agents to support back in time recordings. The linear packager 204 contains a window of content behind the live point. FIG. 3 shows an example DVR manifest agent 302 that may be configured to continuously monitor manifests for updates and maintain a cache of manifests within a rolling window. Maintaining a window cache of manifests allows for recording and/or storing video segments (e.g., content segments) behind the live point that fall within the linear packager 204 buffer. Requests to record and/or store video segments outside of this buffer may default to the oldest segment available in the window. A match from a single query representing multiple users may generate a batched notification, which may result in a batched recording request. Copies may be unique per user, but batched recordings result in optimizations to the underlying network and storage system by generating a fan-out request to persist the unique video segments per user. In another example, the copies may not be unique per user. Combining of users with the same query optimizes searching and cloud DVR 212 resources.

Upon identifying one or more matches, the notification component 210 may transmit one or more notifications to a device such as the media device 120, or other user device, that content of interest is appearing on a stream. A notification may be sent even if the user is not yet entitled to the content. The media device 120 may provide the user with one or more interface elements (e.g., within the electronic program guide) that, when engaged by a user, cause the media device 120 to play the content that caused the match. In an example, in an interactive VOD context, the media device 120 may rewind linear content to the start boundary (e.g., rewind live television). The notification component 210 may provide notifications via, for example, SMS, email, and push notifications to mobile devices.

The video analysis component 206 may be configured to determine transitions in content as opportunities for start boundaries and end boundaries. These transitions provide a smooth viewing experience for a user and may be useful when identifying content of interest within a program. A transition in content may be a scene change, which may be a change in location or time of a show that acts as a cue to the viewer. For example, a TV show may comprise several scenes that make up the TV show. A first scene may be a conversation between two characters of the TV show discussing the characters' plans for a road trip for the upcoming weekend. The next scene may be the two characters in a car driving on the road trip the characters discussed. Thus, the scene change acts as a cue to the viewer that a transition has occurred between discussing the characters plans for the road trip, and when the characters are on the road trip, without needing additional explanation as to what occurred between the discussion and the start of the road trip.

Figure 4:
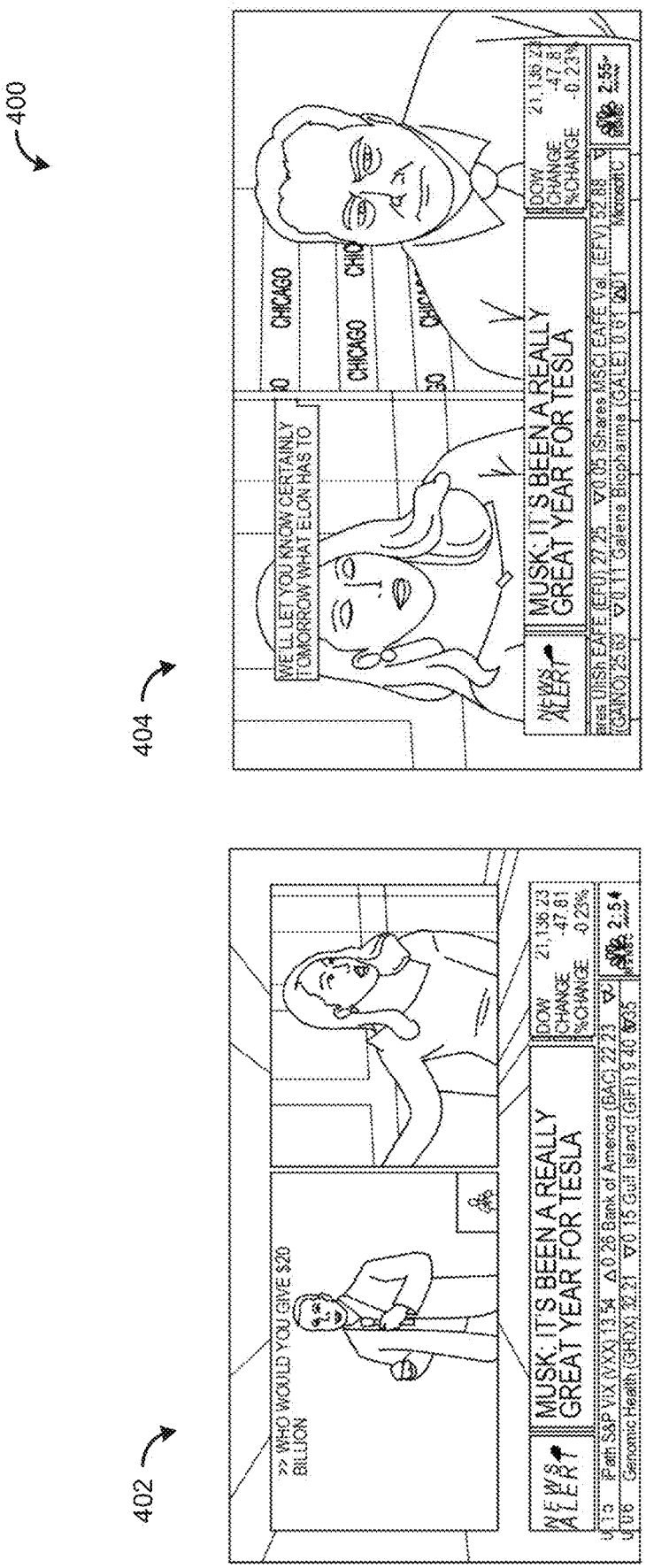
FIG. 4 is an example shot change.

A transition in content may be a shot change. FIG. 4 shows an example content transition 400 in the form of a shot change. A shot change may be a slightly different camera perspective within the same scene of content, whereas a scene change occurs when an entirely different camera perspective occurs within the same program. The content transition 400 goes from a first camera perspective in shot 402 to a second camera perspective in shot 404. The shot 402 is a view of a scene of a TV show including a female host and a video of an individual. The camera perspective then transitions to shot 404, which is a view of the same scene, but instead of the video of the individual, the female host is discussing the subject matter of the video with another individual. The transition from shot 402 to shot 404 is not a scene change because the scene is still the same and the only change is the camera perspective. Thus, FIG. 4 highlights the distinction between a shot change and a scene change.

Figure 5:
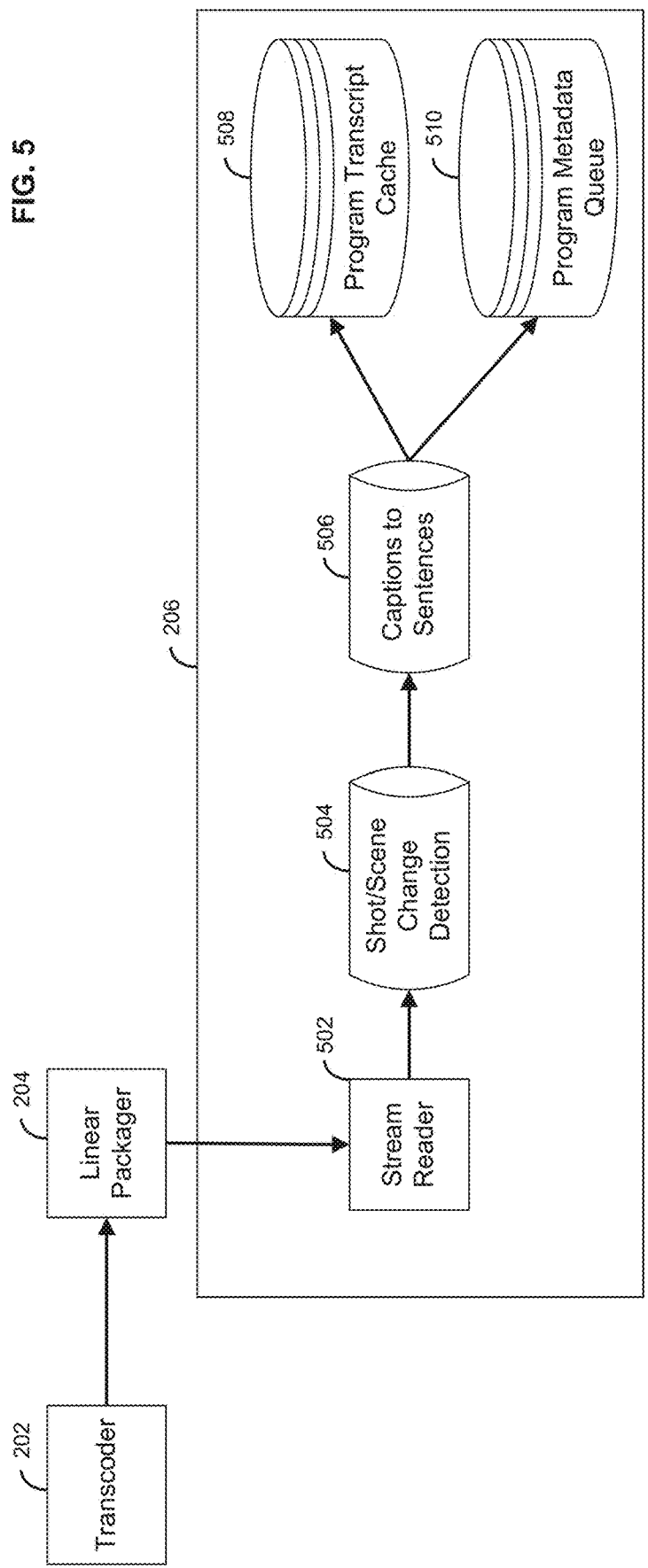
FIG. 5 is an example video analysis environment.

FIG. 5 shows an example of a video analysis performed by the video analysis component 206. The transcoder 202 may provide content that is encoded to a linear packager 204. For example, the content may be encoded using MPEG 2, and the transcoder 202 can provide the content via Multicast. A stream reader 502 may monitor linear manifests from the linear packager 204. For example, the linear packager 204 may provide manifests to the stream reader 502 via HTTP DASH. The stream reader 502 may scale horizontally enabling consumption of a plurality of streams, for example, over 10,000 local and/or national streams. Each time a monitored manifest is updated, video segments from the monitored manifest are retrieved and video frames are analyzed for shot and scene changes by shot/scene change detection component 504.

The shot/scene change detection component 504 may utilize SCTE-35 signaling in the manifest to determine local ad spots, identifying a scene change. When SCTE-35 signaling is not available, shot and scene detection algorithms may identify content transitions. Decoding image packets for color and edge information and applying mathematical formulas to detect movement from one frame to the next. A shot change may be determined by comparing color histograms of adjacent video frames and applying a threshold to that difference. Shot changes may be determined to exist wherever the difference in the color histograms of adjacent frames exceeds this threshold. Many techniques are known in the art for shot change detection. One algorithm is described in Tardini et al., *Shot Detection and Motion Analysis for Automatic MPEG-7 Annotation of Sports Videos,* 13th International Conference on Image Analysis and Processing (November 2005), incorporated herein by reference in its entirety. Other techniques for shot change detection may be used as well, such as using motion features. Another known technique is described in A. Jacobs, et al., *Automatic shot boundary detection combining color, edge, and motion features of adjacent frames,* Center for Computing Technologies, Bremen, Germany (2004), incorporated herein by reference in its entirety.

In an example, once the shot/scene change detection component 504 detects one or more shot changes and/or scene changes, a captions-to-sentences component 506 may process closed captioning data. Each video segment may carry an encoder boundary point (EBP) containing a sequential timestamp relative to the transcoder 202. The captions-to-sentences component 506 may extract timestamps from the content. For example, the captions-to-sentences component 506 extract EBP timestamps along with textual Closed Captioning (CEA-608/708) data, which resides in picture user data on the transport stream. As another example, the component 504 can detect signals encoded within the content stream. For example, the content may be encoded with signals (e.g., using the SCTE-35 standard) that indicate changes in the content, such as scene changes. These scene changes may be used to determine the start and end boundary. As a further example, the captions to sentences component 506 can determine speech from audio associated with the content. The captions to sentences component 506 can then convert the audio to text (e.g., speech to text conversion). Sentence formation is constructed if there is a partial phrase. A series of phrases, which ultimately form a sentence, may be spread over multiple video segments. Multiple video segments may result in more than one shot or scene change. All shot and scene change times may be reflected as an array of timestamps (e.g., EBP times) in a program metadata document, as shown in FIG. 6.

Once a sentence is formed it may be included in the resulting program metadata document, which may then be pushed onto a program metadata queue 510 making it available for search. A program transcript document may also be maintained for each program (e.g., show, movie, etc. . . . ). The insertion of the timestamps (e.g., the EBP time) in front of each sentence allows downstream search components to have transcoder time relevant sentences for use cases requiring a full transcript search. All content transitions may also be recorded in the program transcript document. Resulting program transcript documents may be maintained in a program transcript cache 508.

The linear search component 208 may be used to search the stream. In an example, the linear search component 208 may be used to search the stream after the video analysis component 206 has analyzed at least a portion of a stream. Typical search engines may store static documents, build one or more inverted indexes, and execute queries against the indexes. The linear search component 208 inverts this concept by creating one or more indexes of a query or queries. As program metadata documents arrive and/or are generated the program metadata documents are tokenized and searched against the query indexes. FIG. 6 is a program metadata document. Candidate query matches are returned, requiring a document search in order to resolve search hits and relevancy. This inverted search concept may be referred to as a stream search (program metadata document search), or a reverse search, and may reduce the number of queries executed.

The linear packager 204 outputs video segments having a fixed duration (e.g., 2 second video segments) therefore dialogue changes would then be received at a cadence corresponding to the fixed duration per linear stream. In the case of hundreds of linear streams, the video analysis component 206 may produce program metadata documents at a rate of hundreds (e.g., 200-300) per second. The volume of queries combined with the influx of program metadata documents makes streaming search a desirable technique for simple topic queries.

Searching linear dialogue at scale may equal hundreds of thousands of queries. For example, implementation on a national scale may include running queries across hundreds of linear streams all throughout the United States. In another example, queries are run across linear streams in large regional deployments. Queries added to the system may exist as live searches until removed by the user. The searches may be asynchronous and executed on the stream of dialogue text each time a full sentence is pulled from the program metadata queue 510. As another example, the searches may be executed on a window of text, an entire program of content, several (e.g., 2, 5, 15, 20, etc.) sentences, and so forth.

Figure 7:
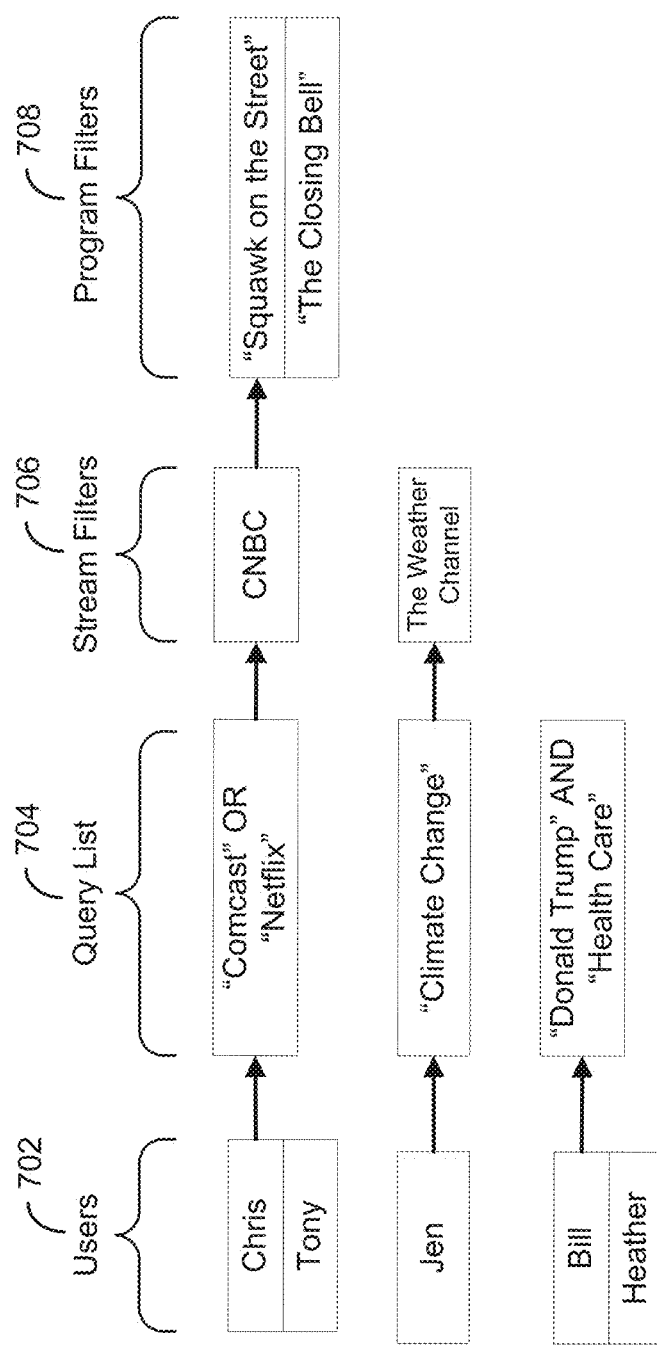
FIG. 7 is an example operation of a linear search component.

FIG. 7 shows an example operation of the linear search component 208. Users 702 may submit queries 704 with preferences such as a stream filter 706 or a program filter 708 for fine-grained search over desired programming. A user 702 may choose a broad search across all available linear streams rather than filtering on a single program. In FIG. 7, Chris and Tony are interested in "Comcast OR Netflix" but only if it is discussed on CNBC's "Squawk on the Street" or "The Closing Bell". Jen is interested in "Climate Change" if it appears on any Weather Channel program. Bill and Heather want the broadest search across any linear stream for discussions of "Donald Trump" AND "Health Care".

Figure 8A:
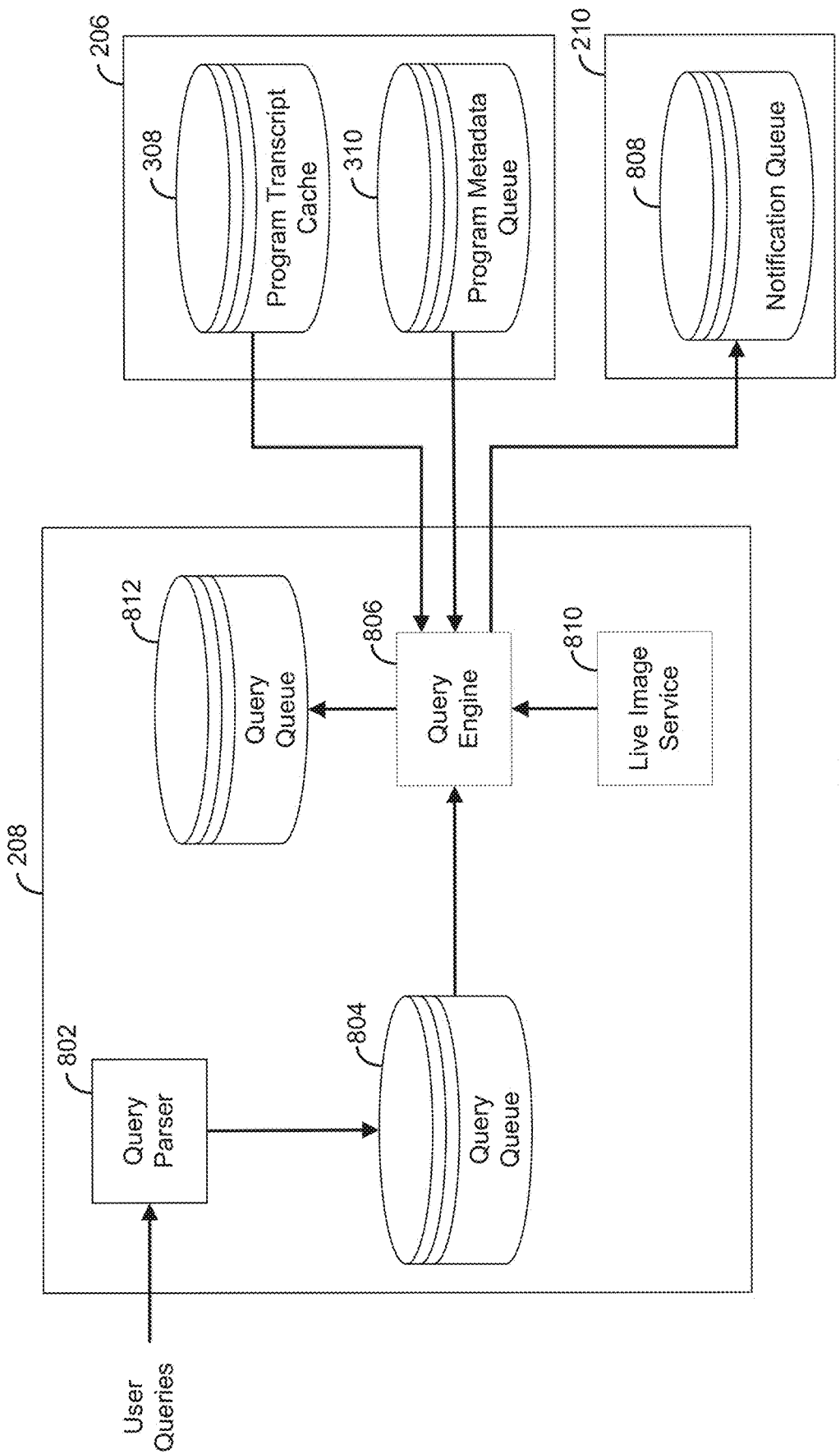
FIGS. 8A-8B are block diagrams of example components of the linear search component.

FIG. 8A shows example components of the linear search component 208. A query parser 802 may receive one or more queries and may filter and/or expand the one or more queries. Editorialized synonyms may be used to expand popular searches into broader meanings. The two queries "Donald Trump" and "President Trump" would result in the same query "President Trump OR Donald Trump". Queries may then be normalized into an internal query representation and submitted to a query queue 804. A query engine 806 may apply queries from the query queue 804 to one or more of the program transcript cache 508 and/or the program metadata queue 510 of the video analysis component 206. Any resulting matches may be provided to a notification queue 808 of the notification component 210.

The query engine 806 may identify content transitions before and/or after the time of a query match. The moment of a commercial end may be used as the start boundary of the video clip—in front of the match. A scene change that occurs at some time after the match may represent the end boundary of the video clip. The query engine 806 utilizes a cached content transition timeline from the program metadata queue 310 to capture a start boundary and end boundary for a desired video clip.

Figure 8B:
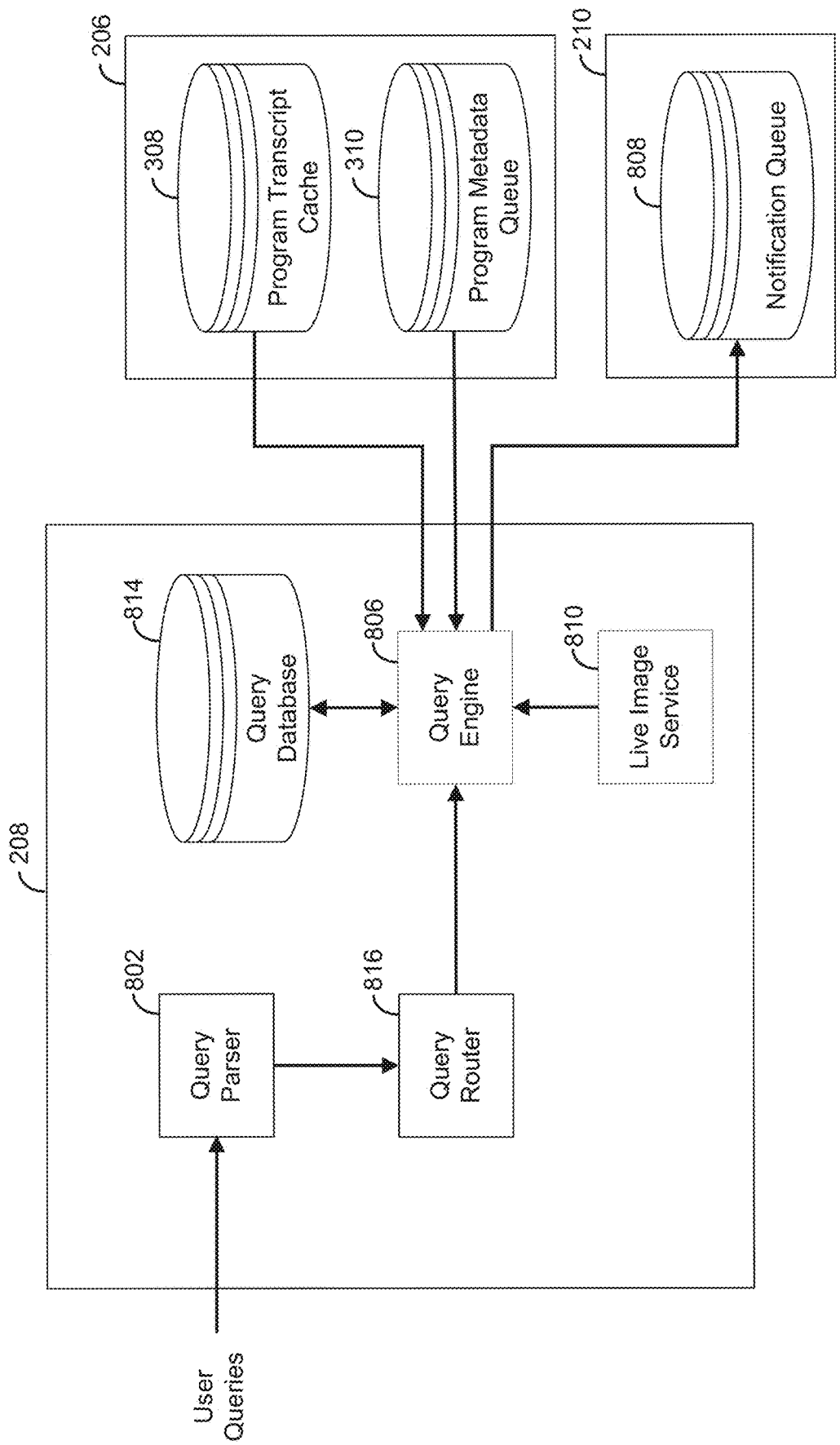

FIG. 8B shows example components of the linear search component 208. Specifically, FIG. 8B shows an example where the query queue 804 of FIG. 8A is replaced with a query router 816. The query router 816 routes queries to one or more query engines 806. While a single query engine 806 is shown for ease of explanation, a person skilled in the art would appreciate that there can be any number of query engines 806. After receiving the query from the query router 816, the one or more query engines 806 performs a search against the query the query engine 806 receives. For example, the query engine 806 may communicate with the query database 814 to store received queries, as well as retrieve queries to execute. Thus, the query engine 806 can operate without a query queue 812 of FIG. 8A. While shown as being separate device for ease of explanation, a person of skill in the art would appreciate that the query engine 806 can include the query database 814.

Figure 9:
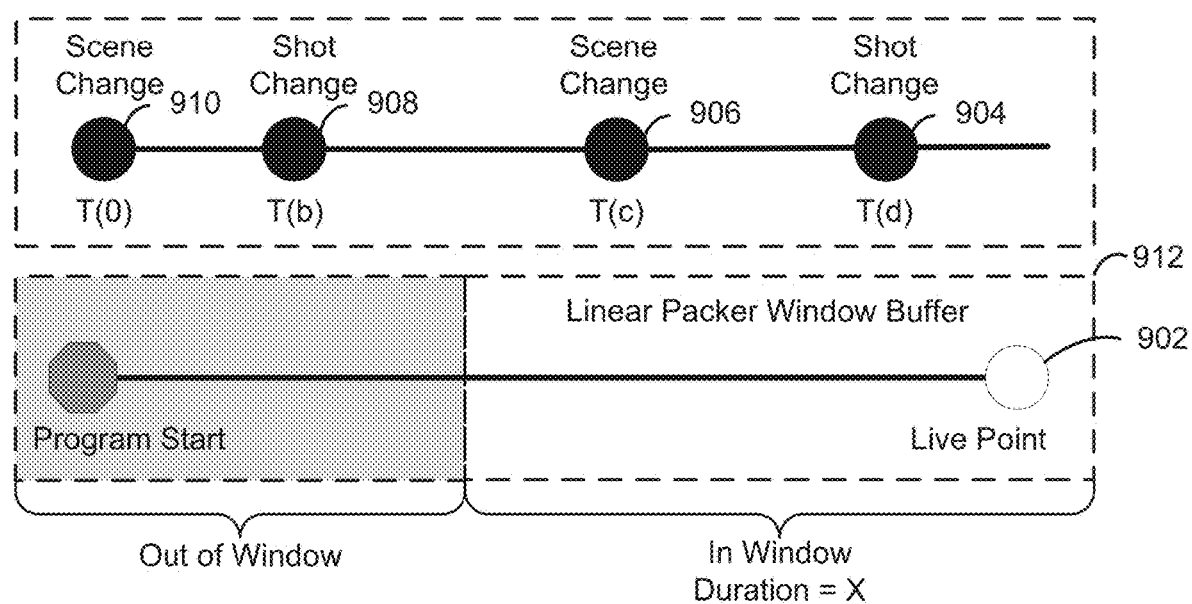
FIG. 9 is an example content transition timeline.

As shown in FIG. 9, a search match occurs at a live point 902, a shot change 904 and a scene change 906 may be identified as content transitions within a linear packager window buffer 912. The timestamp (e.g., the EBP time) of the shot change 904 or the scene change 906 (walking backwards in time) may be used as the start boundary for a video clip. In an example, scene changes may be preferred over shot changes and if neither content transition is available in the past, the related EBP time of the match may be used. As shown in FIG. 9, the EBP time for the scene change 906 may be selected as the start time of the recording. The scene change 906 is within the linear packager window buffer 912 allowing for a successful back in time start of a recording. As another example, the scene change 906 may be outside the packager window buffer 912. A shot change 908 and a scene change 910 are excluded from consideration, as both have EBP times outside of the linear packager window buffer 912.

Figure 10:
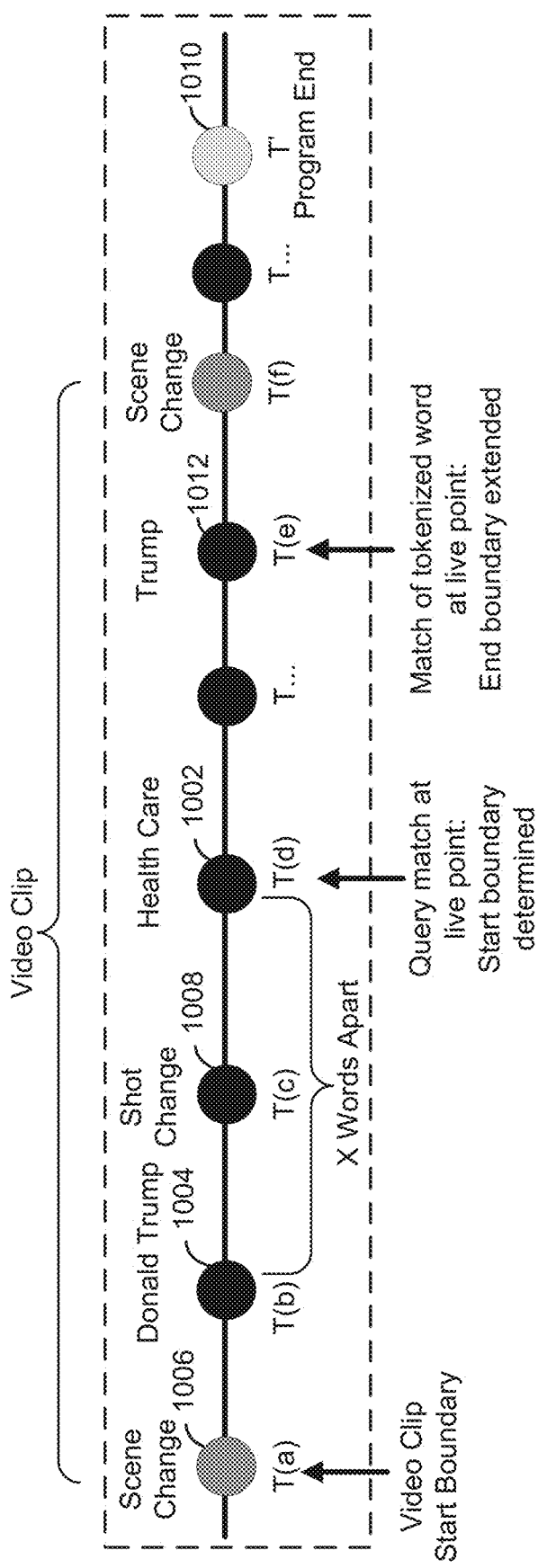
FIG. 10 is an example content transition timeline.

FIG. 10 shows an example identification of a start boundary and an end boundary for a video clip. A query "Donald Trump" AND "Heath Care" {X} may be received, wherein a match will occur only if the two phrases are at most X words apart. At a live point T(d) 1002, the tokenized phrase "Health Care" appears in a current sentence in a program metadata document triggering a proximity search against a corresponding program transcript document in the program transcript cache 508. A match is found at T(b) 1004 for "Donald Trump" within X words. The time (e.g., the EBP time) before "Donald Trump" appears at T(b) 1004 may be used to find a prior scene change time (e.g., the EBP time) in a content transition timeline cache, which results in T(a) 1006. Since a shot change at T(c) 1008 falls within the proximity query it is excluded from use as a start boundary.

If there is a preference to record and/or store the remaining program, an end time 1010 of the program may be determined and set as an end boundary for the video clip. Otherwise the end boundary may be set as a fixed duration and adjusted dynamically as the program progresses. At this point a notification may be generated and sent to the notification component 210, resulting in the start of a recording.

Desired video clip durations are monitored and end boundaries may be extended if tokenized words from the query are found in new sentence dialogue. As time progresses, at T(e) 1012 the tokenized word "Trump" is in the current dialogue and the end boundary may be extended by a fixed duration. At T(f) 1014 the desired duration of the video clip has been met and there is a scene change and the new end boundary is set to T(f) 1014.

Matches found by the query engine 806 in the program transcript cache 508 and/or the program metadata queue 510 may also trigger a thumbnail snapshot (e.g., an image) of the linear program associated with the match via a live image service 710. A location of the image and the matched query, along with start and end boundaries of the video clip may be included as part of the metadata which is pushed to the notification queue 808 and stored in the program metadata queue 310. Information within this message may be stored and may provide the information required for the notification component 210 to schedule a recording. In another example, the end boundary may be sent as a separate notification after it is determined some time after a start boundary.

Figure 11:
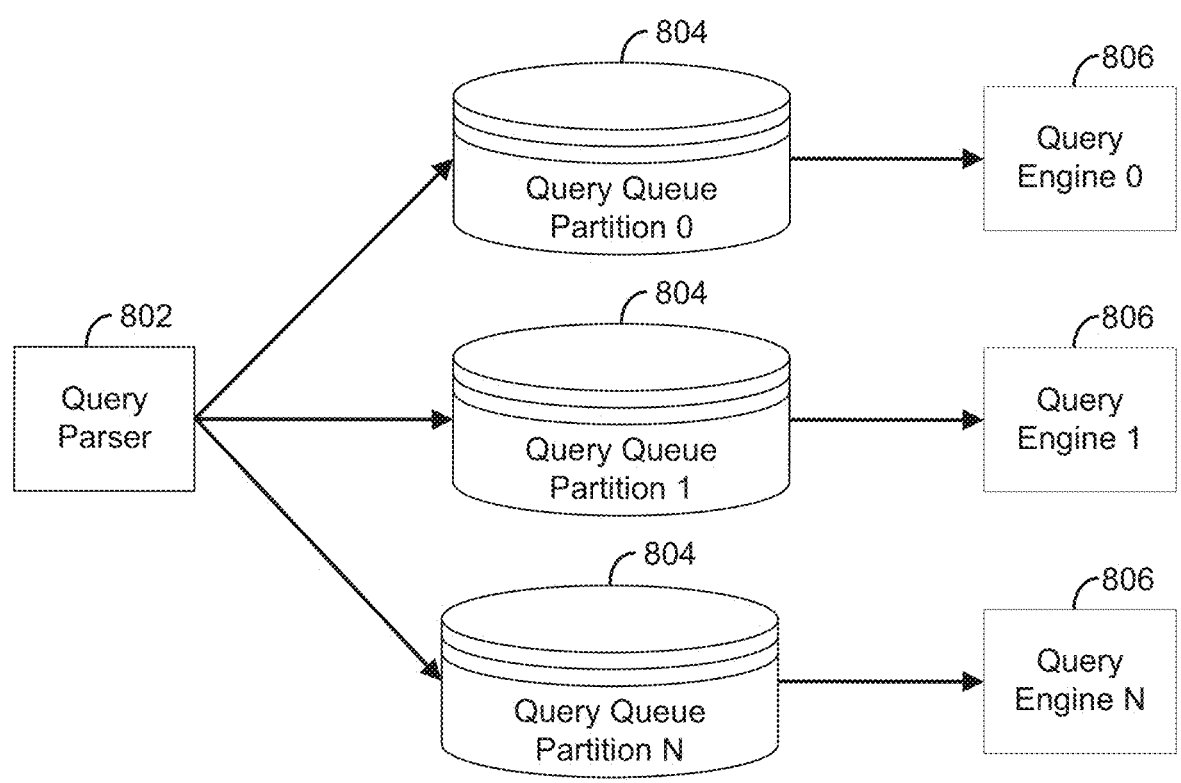
FIG. 11 shows the use of query partitions

FIG. 11 shows an example use of query partitions within the query queue 804 in conjunction with the query parser 802 and the query engine 806. The query queue 804 is partitioned so that each partition holds a subset of user queries. Using hashing on expanded queries provides a common routing technique resulting in the assigning identical queries to the same partition: Partition ID=Hash (Query) % Total Partitions. This approach ensures that the same query engine 806 handles identical queries. This allows creation of a one-to-many relationship of queries to users so that only a single query is executed for multiple users. The partitions also help provide parallelism for Query Engines that may scale horizontally. Such query partitioning reduces the amount of queries executed. It also provides optimizations resulting from being able to batch notification messages and cloud DVR recordings.

Figure 12:
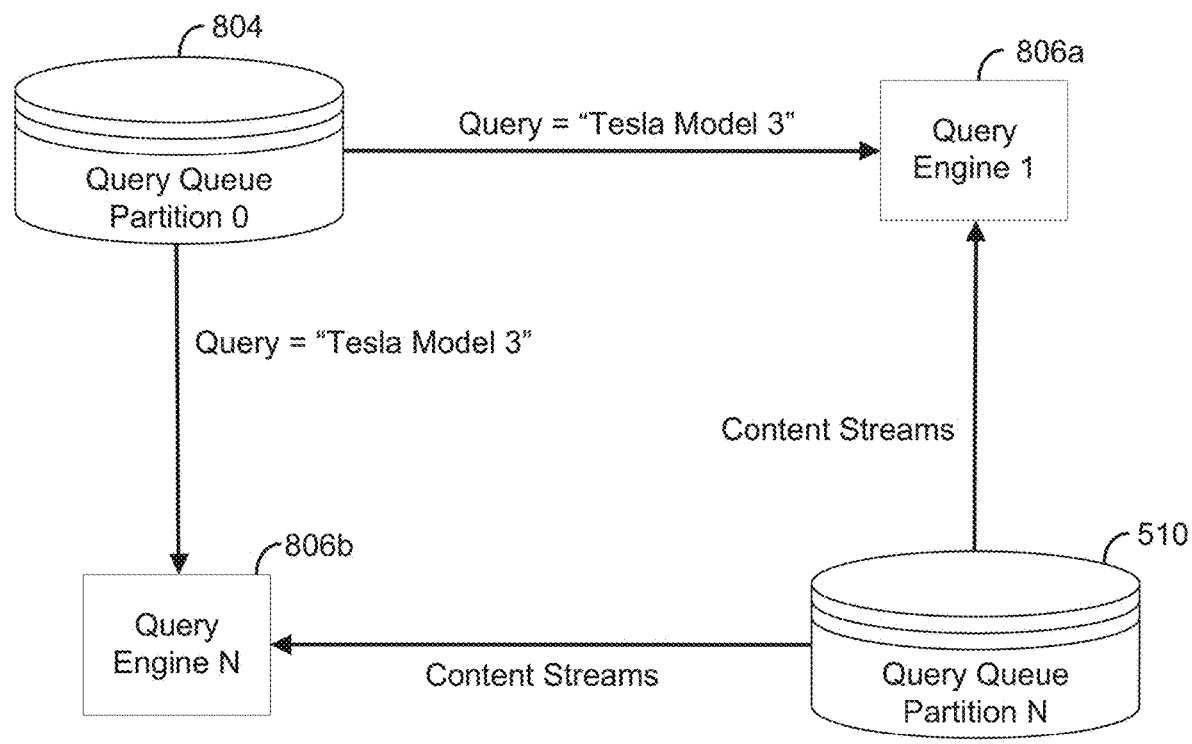
FIG. 12 shows interactions between query engines, a query partition, and a program metadata queue.

FIG. 12 shows example interactions between query engines 806, a query partition 804, and the program metadata queue 510. Each query engine 806 may be initialized with a unique query partition identifier (ID) and a list of linear stream IDs. Linear stream IDs may be used to identify program metadata documents from the program metadata queue 510 and to fetch program transcripts from the program transcript cache 508 (not shown). States of running queries and content transition timelines resulting from shot and scene changes may be cached for active programs. Keeping state of matched queries on an active program ensures that query engine 806 restart scenarios do not disrupt active matches, which have determined a start boundary but not yet an end boundary for the content of interest. As shown in FIG. 12, a query engine may be assigned to one or more content streams. The content streams may be from non-standard content providers. For example, a query engine 806a may be assigned to streams of CNBC and MSNBC, whereas a query engine 806b may be assigned to streams of Weather Channel and NBC. FIG. 12 also shows that both the query engine 806a and the query engine 806b may receive queries from the same query queue partition 804 and apply the queries to the different program metadata 510. In one example, the query engine 806a and the query engine 806b may apply the queries to the same program data 510. As another example, the query engine 806a may receive a first set of program metadata and the query engine 806b may receive a second set of program metadata. The first and second set of program metadata may be based on the respective streams that the query engines 806a, 806b, are consuming. Thus, the first set of program metadata may be different from the second set of program metadata because the query engines 806a, 806b, may be consuming different streams.

The described methods and systems may use pre-filtering techniques to eliminate queries that are not a possible match and present queries, which are possible matches. As the methods and systems monitor and execute queries as new transcript documents are received, traditional search techniques may be used against program transcript documents for various use cases. Query engines that initialize may be between the start and end time of the program. Such techniques may be used to support late arriving queries—queries added between the start and end time of the program. Such techniques may be used to support complex queries (for example, a conversationally relevant proximity query "Donald Trump" AND "Health Care" {100} would match if "Donald Trump" and "Health Care" appear at most 100 words apart).

In an example, optimizations may be used to help limit more expensive transcript searches. The methods and systems may be configured to search the transcript document only if any of the tokenized words of the query are found in a current sentence. Searching the transcript document not only provides opportunities to trigger recordings with a start boundary back in time, but notifications from matches may result in other non-recording actions. For example, a user may be presented an option to tune to a point in time behind the live point where their interest appears. Tuning back in time is possible through Instant VOD (iVOD), a service supporting live program rewind. A user may also be presented an option to set a scheduled recording for the program's next airdate. Timestamps (e.g., EBP times) embedded in the transcript document may provide the timestamps needed for recordings and notifications. FIG. 13 represents a search result from the query "Tesla" against a program transcript document.

A few minutes into a typical hour-long news analysis program, such as MSNBC's Hardball with Chris Mathews, may result in an average program transcript document that contains less than several hundred words. By the end of the program, however, the program transcript document may be over 12,000 words not including commercial dialogue. This may produce a roughly 20 kilobyte document size—resulting in about 10 megabytes of RAM for 500 one-hour programs. These program transcript documents may be maintained locally in-memory for the duration of a Query Engine runtime.

In one example, both the program metadata document search and the program transcript document search are compute bound. In another example, the program metadata document search and the program transcript document search are not compute bound. The frequency of program transcript document updates, which requires re-indexing, is an added burden. Both stream search and traditional search techniques have different performance considerations. These considerations may be addressed by adjusting two parameters in the system, total query partitions in the system and total list of linear streams consumed by each query engine. This also allows for flexibility for tuning deployments for different regions with different numbers of local and national streams, running on different hardware.

Figure 14:
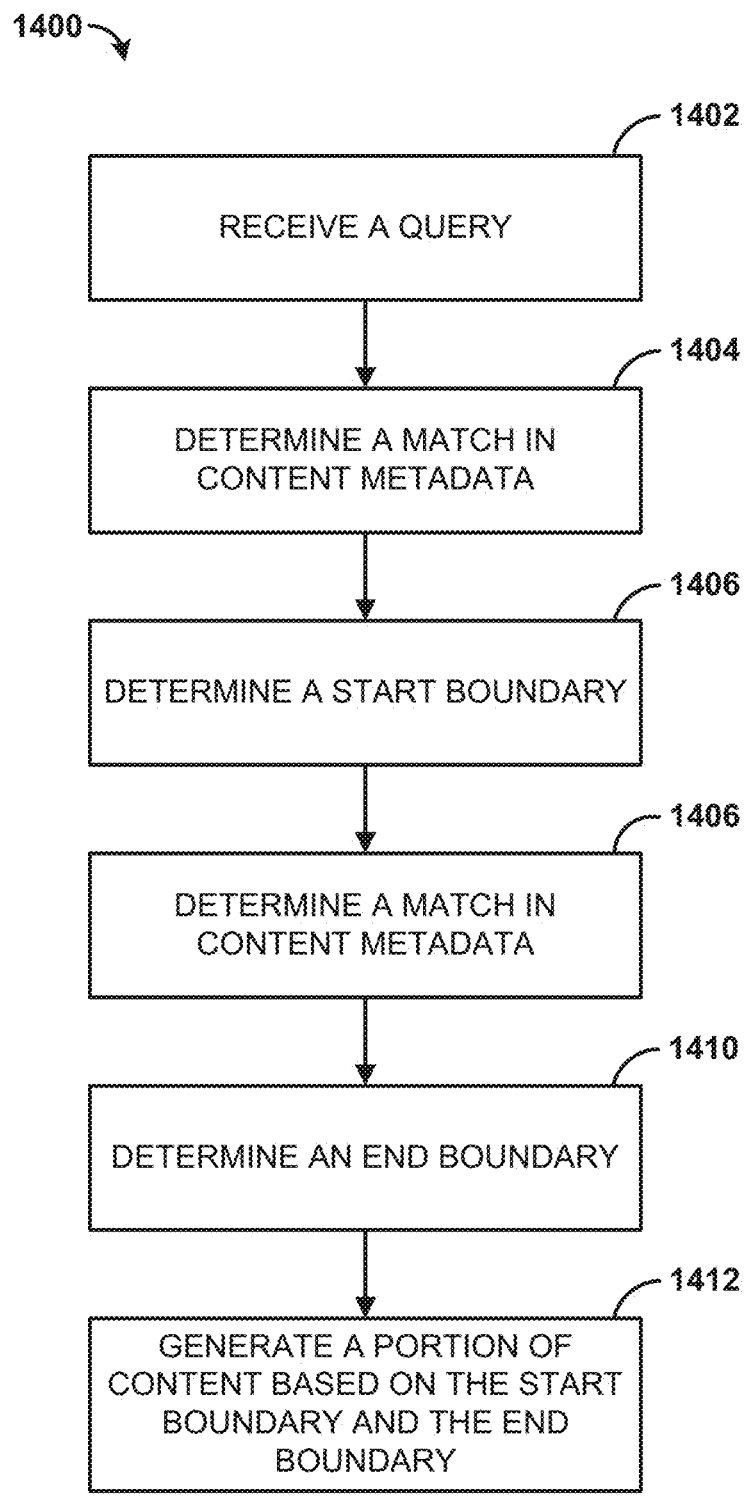
FIG. 14 is a flowchart of an example method.

FIG. 14 is a flowchart of an example method 1400. At 1402, a query may be received, e.g., by an edge device 128. The query may comprise one or more words and/or phrases. The query may be applied to content, such as one or more content streams. The query may comprise one or more parameters. The one or more parameters may comprise a program filter, a stream filter, a proximity indicator, combinations thereof, and the like. The program filter may comprise a restriction on which programs of content should be searched. The stream filter may comprise a restriction on which streams of content should be searched. The proximity indicator may indicate a proximity outside of which a match will be ignored (e.g., find "x" and "y" within 100 words). The query may comprise a first portion and a second portion. For example, the query may comprise "Donald Trump" as the first portion and "healthcare" as the second portion.

At 1404, a match may be determined in content metadata. The match may comprise a first match for the first portion. The content metadata may comprise linear content metadata. Linear content metadata may be metadata generated and/or received for linear content segments as they arrive. The content metadata may comprise dialogue data, content transition data (e.g., shot change data and/or scene change data), advertisement break data, social metadata, combinations thereof, and the like. Dialogue data may be, for example, closed captioning data and/or speech-to-text data). Shot change data may represent shot boundaries within the content item. Shot boundaries are points of non-continuity in the video, e.g., associated with a change in a camera angle or scene. Shot change data may be detected by video analysis. A shot change may also represent a start or end of commercial. Scene change data may represent a start or end of a scene. Scene change data may be detected by video analysis. A scene change may also represent a start or end of commercial. Advertisement break data may represent a start or end of an advertisement and/or group of advertisements. Advertisement break data may be detected by video analysis or may be signaled within closed captioning data and/or a manifest). Social metadata may comprise communications from users of a social platform such as Tweets, posts, comments, etc. . . . . Any and/or all the metadata described above may comprise timestamps within the program start and program end time. The timestamps may be presentation timestamp (PTS), encoder boundary point (EBP), a Unix timestamp, and the like. A match may comprise locating a word and/or phrase that exactly matches the first portion or a match may comprise locating a word and/or phrase that is similar and/or analogous to the first portion.

At 1406, a start boundary may be determined. The start boundary may be determined by accessing the content metadata. The start boundary may be determined as preceding a time associated with the first match. The time associated with the first match may relate to a timestamp associated with the occurrence of the words and/or phrase in the underlying content and/or content stream(s). Determining the start boundary preceding the time associated with the first match may comprise determining a time associated with a first duration preceding the time associated with the first match, determining a first content transition nearest the time associated with the first duration, and determining a time associated with the first content transition as the start boundary. The first duration may be a desired duration representing the minimal amount of video desired before a match occurs. The first content transition may comprise a shot change, a scene change, combinations thereof, and the like. The time associated with the first duration may be determined by subtracting the first duration from the time associated with the first match. For example, if the first match occurs at 00:15:02 and the first duration is 00:02:00, then the time associated with the first duration will be 00:13:02. The first content transition nearest the time associated with the first duration may comprise a shot change or a scene change prior to, or after, the time associated with the first duration.

At 1408, another match in content metadata may be determined. The content metadata may comprise linear content metadata. Determining another match may comprise determining a second match in the content metadata for the second portion. Determining the second match in the content metadata for the second portion may comprise determining the second match in linear content metadata received subsequent to the first match.

At 1410, an end boundary may be determined. The end boundary may be determined by accessing the content metadata. Determining the end boundary may comprise determining an end boundary following a time associated with the second match. Determining the end boundary following the time associated with the second match may comprise determining a time associated with a second duration following the time associated with the second match, determining a second content transition nearest the time associated with the second duration, and determining a time associated with the second content transition as the end boundary. The second duration may be a desired duration representing the minimal amount of video desired after a match occurs. The second content transition may comprise a shot change, a scene change, combinations thereof, and the like. The time associated with the second duration may be determined by adding the second duration to the time associated with the second match. For example, if the second match occurs at 00:17:15 and the second duration is 00:03:00, then the time associated with the first duration will be 00:20:15. The second content transition nearest the time associated with the second duration may comprise a shot change or a scene change prior to, or after, the time associated with the second duration.

At 1412, a portion of the content may be generated based on the start boundary and the end boundary. Generating, the portion of the content may comprise extracting the portion of the content as a video clip or storing a content identifier, the start boundary, and the end boundary. The stored content identifier, the start boundary, and the end boundary may be used at subsequent time to extract the video clip or to begin and end playback of content at the start boundary and end boundary.

The method 1400 may further comprise transmitting a notification upon the occurrence of the first match, the second match, extending the start boundary, or extending the end boundary. Transmitting the notification upon the occurrence of the first match, the second match, extending the start boundary, or extending the end boundary, may comprise transmitting the notification to a cloud digital video recorder.

Figure 15:
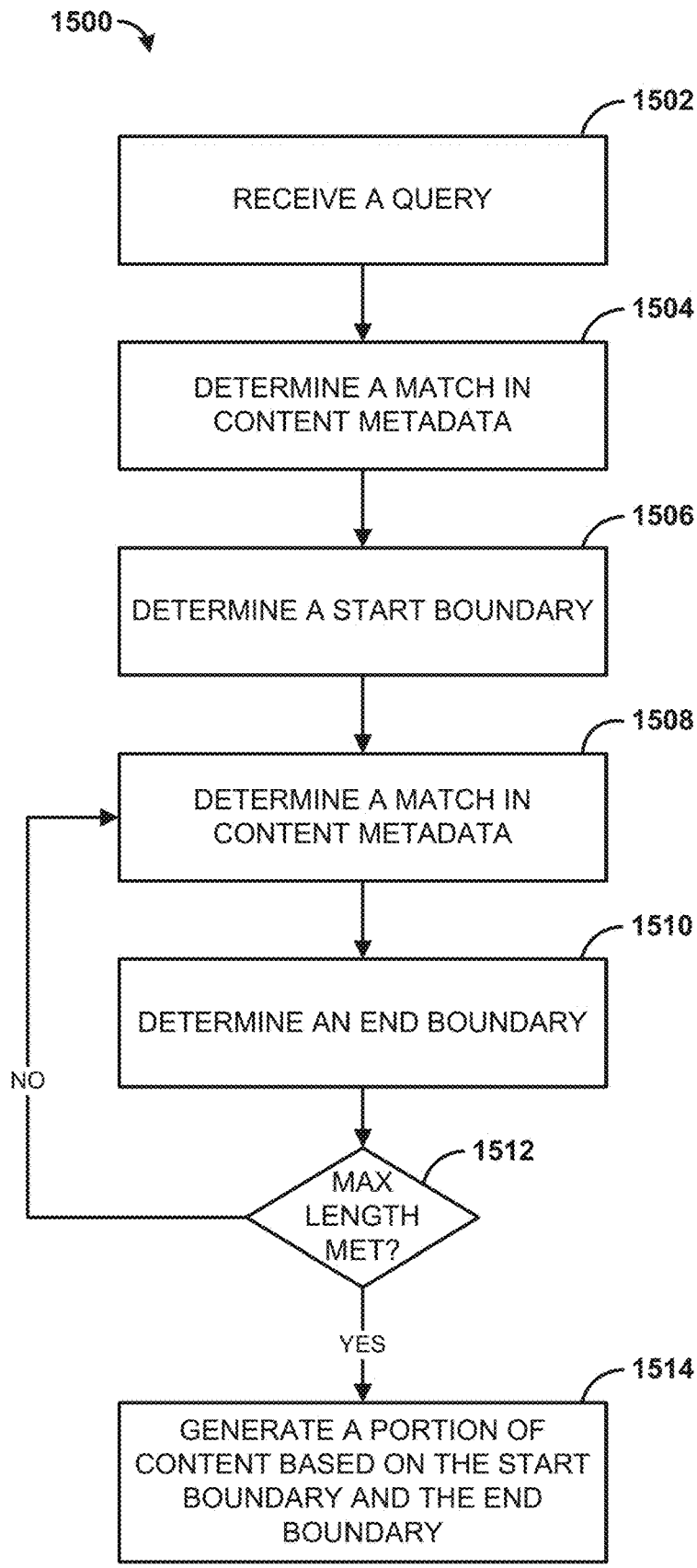
FIG. 15 is a flowchart of an example method.

FIG. 15 is a flowchart of an example method 1500. At 1502, a query may be received, e.g., by an edge device 128. The query may be associated with content. The query may comprise a first portion and a second portion. For example, the query may comprise two separate search terms and/or phrases to be searched in conjunction. For example, ""Donald Trump" and "healthcare"". The query may comprise one or more parameters. The one or more parameters may comprise a program filter, a stream filter, a proximity indicator, combinations thereof, and the like. The program filter may comprise a restriction on which programs of content should be searched. The stream filter may comprise a restriction on which streams of content should be searched. The proximity indicator may indicate a proximity outside of which a match will be ignored (e.g., find "x" and "y" within 100 words).

At 1504, a match in content metadata may be determined. Determining a match in content metadata may comprise determining a first match for the first portion in linear content metadata. Linear content metadata may be metadata generated and/or received for linear content segments as they arrive. The content metadata may comprise dialogue data, content transition data (e.g., shot change data and/or scene change data), advertisement break data, social metadata, combinations thereof, and the like. Dialogue data may be, for example, closed captioning data and/or speech-to-text data). Shot change data may represent shot boundaries within the content item. Shot boundaries are points of non-continuity in the video, e.g., associated with a change in a camera angle or scene. Shot change data may be detected by video analysis. A shot change may also represent a start or end of commercial. Scene change data may represent a start or end of a scene. Scene change data may be detected by video analysis. A scene change may also represent a start or end of commercial. Advertisement break data may represent a start or end of an advertisement and/or group of advertisements. Advertisement break data may be detected by video analysis or may be signaled within closed captioning data and/or a manifest). Social metadata may comprise communications from users of a social platform such as Tweets, posts, comments, etc. . . . . . Any and/or all the metadata described above may comprise timestamps within the program start and program end time. The timestamps may be presentation timestamp (PTS), encoder boundary point (EBP), a Unix timestamp, and the like. A match may comprise locating a word and/or phrase that exactly matches the first portion or a match may comprise locating a word and/or phrase that is similar and/or analogous to the first portion.

At 1506, a start boundary may be determined. A start boundary preceding a time associated with the first match may be determined. The start boundary may be determined by accessing the content metadata. The time associated with the first match may relate to a timestamp associated with the occurrence of the words and/or phrase in the underlying content and/or content stream(s). Determining the start boundary preceding the time associated with the first match may comprise determining a time associated with a first duration preceding the time associated with the first match, determining a first content transition nearest the time associated with the first duration, and determining a time associated with the first content transition as the start boundary. The first duration may be a desired duration representing the minimal amount of video desired before a match occurs. The first content transition may comprise a shot change, a scene change, combinations thereof, and the like. The time associated with the first duration may be determined by subtracting the first duration from the time associated with the first match. For example, if the first match occurs at 00:15:02 and the first duration is 00:02:00, then the time associated with the first duration will be 00:13:02. The first content transition nearest the time associated with the first duration may comprise a shot change or a scene change prior to, or after, the time associated with the first duration.

At 1508, another match in content metadata may be determined. Determining the match in content metadata may comprise determining a second match for the second portion in linear content metadata received subsequent to the first match. Linear content metadata may be metadata generated and/or received for linear content segments as they arrive.

At 1510, an end boundary may be determined. An end boundary following a time associated with the second match may be determined. The end boundary may be determined by accessing the content metadata. Determining the end boundary may comprise determining an end boundary following a time associated with the second match. Determining the end boundary following the time associated with the second match may comprise determining a time associated with a second duration following the time associated with the second match, determining a second content transition nearest the time associated with the second duration, and determining a time associated with the second content transition as the end boundary. The second duration may be a desired duration representing the minimal amount of video desired after a match occurs. The second content transition may comprise a shot change, a scene change, combinations thereof, and the like. The time associated with the second duration may be determined by adding the second duration to the time associated with the second match. For example, if the second match occurs at 00:17:15 and the second duration is 00:03:00, then the time associated with the second duration will be 00:20:15. The second content transition nearest the time associated with the second duration may comprise a shot change or a scene change prior to, or after, the time associated with the second duration.

As another example, two consecutive queries may result in a single match. For example, a query may be run for "Donald Trump" and a second query may be run for "Hillary Clinton." If a match for "Donald Trump" and "Hillary Clinton" occurs within the same segment, a single recording may be saved instead of saving two separate recordings. In this manner, duplicate recordings may be avoided because only a single recording is needed to capture both queries.

At 1512, it may be determined if a maximum content length has been met. A maximum content length may be any length of content that may be included in a video clip. For example, the maximum length may be 1 minute, 2 minutes, 3 minutes, etc. up to and including the entire length of the content (e.g., program end time). If the maximum content length has not been met, the method 1500 returns to step 1508, at which point the method 1500 may determine another match in content metadata. Determining the match in content metadata may comprise determining a third match for the first portion or the second portion of the query in linear content metadata received subsequent to the second match. The third match may be any subsequent match. The third match may comprise a match to one or more tokenized words/phrases from the original query or the entire query. Linear content metadata may be metadata generated and/or received for linear content segments as they arrive. At 1510, the method 1500 may determine the end boundary again. Determining the end boundary may comprise extending the end boundary to a time associated with the third match. Extending the end boundary to a time associated with the third match may comprise determining a time associated with a third duration following the time associated with the third match, determining a third content transition nearest the time associated with the third duration, and determining a time associated with the third content transition as the end boundary. The third duration may be a duration representing an incremental amount to extend a previously calculated end boundary. The third content transition may comprise a shot change, a scene change, combinations thereof, and the like. The time associated with the third duration may be determined by adding the third duration to the time associated with the third match. For example, if the third match occurs at 00:24:15 and the third duration is 00:01:00, then the time associated with the third duration will be 00:25:15. The third content transition nearest the time associated with the third duration may comprise a shot change or a scene change prior to, or after, the time associated with the third duration.

If at 1512, the maximum content length has still not been met, the method 1500 may return to 1508 to repeat the process of extending the end boundary as new matches are found. If at 1512, the maximum content length has been met, the method 1500 may generate a portion of the content based on the start boundary and the end boundary. Generating, the portion of the content may comprise extracting the portion of the content as a video clip or storing a content identifier, the start boundary, and the end boundary. The stored content identifier, the start boundary, and the end boundary may be used at subsequent time to extract the video clip or to begin and end playback of content at the start boundary and end boundary.

The method 1500 may further comprise transmitting a notification upon the occurrence of the first match, the second match, the third match, any other subsequent match, extending the start boundary, extending the end boundary, or a combination thereof. Transmitting the notification upon the occurrence of the first match, the second match, the third match, any other subsequent match, or a combination thereof, may comprise transmitting the notification to a cloud digital video recorder.

Figure 16:
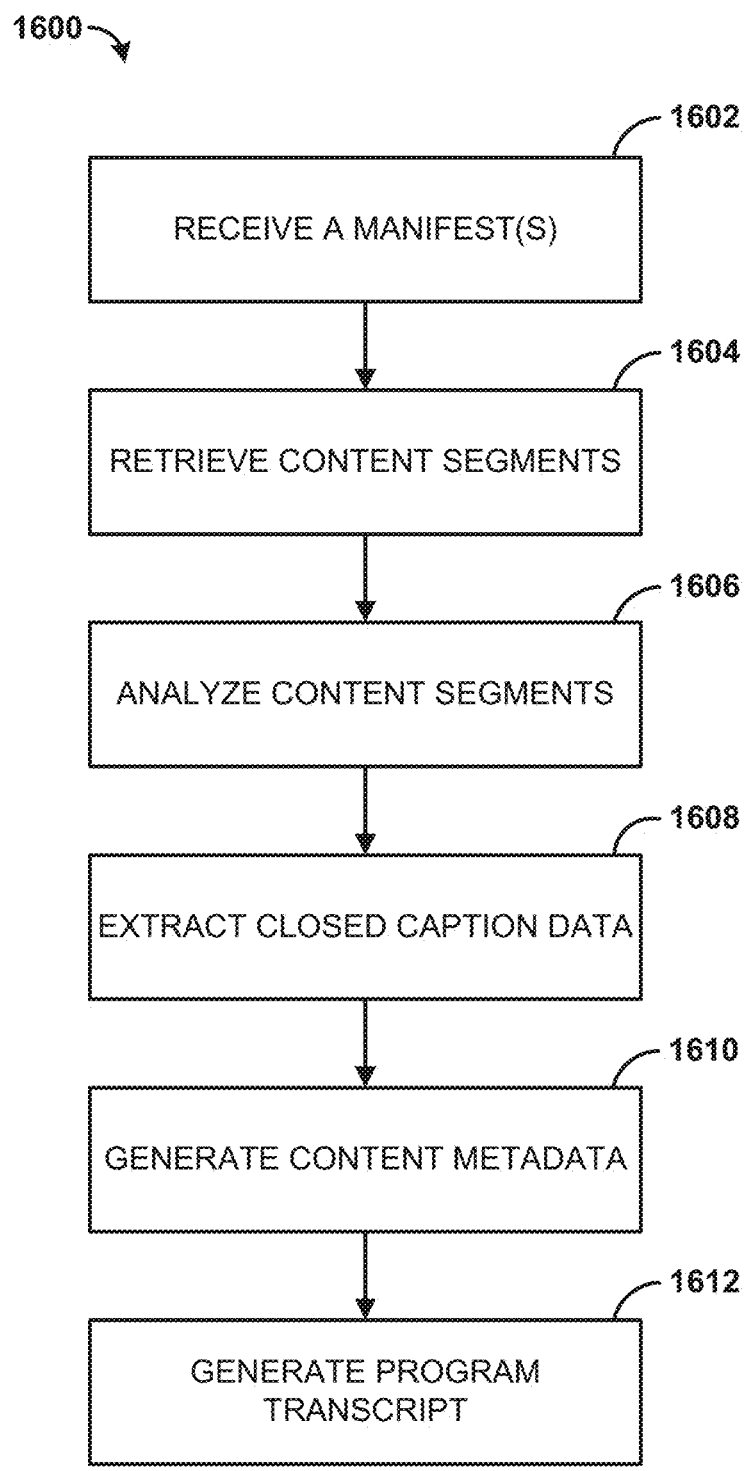
FIG. 16 is a flowchart of an example method.

FIG. 16 is a flowchart of an example method 1600. At 1602, one or more manifest files may be received. For example, the manifest file(s) may be received by a video analysis component from a linear packager. The manifest file(s) may define locations of one or more content segments along with data indicative of one or more advertisement breaks.

At 1604, a plurality of content segments may be retrieved based on the manifest file(s). The plurality of content segments may be retrieved according to the locations specified in the manifest file(s). In an example, the manifest file may be monitored for changes and content segments retrieved in response to a change in the manifest file.

At 1606, the plurality of content segments may be analyzed for one or more content transitions. Analyzing the plurality of content segments for one or more content transitions may comprise determining one or more scene changes, determining one or more shot changes, determining a program start time, and determining a program end time. For example, machine learning may be employed to help determine signals that indicate a change between scenes, shots, and/or program start and end times. Determining one or more scene changes may comprise determining an advertisement signal as a scene change. Determining one or more shot changes may comprise comparing color histograms of adjacent video frames of the plurality of content segments, applying a threshold to a difference between the color histograms, and determining a shot change as a video frame associated with a difference that exceeds the threshold.

At 1608, closed caption data and associated timestamps may be extracted from the plurality of content segments. Each content segment may carry timestamps and/or an encoder boundary point (EBP) containing a sequential timestamp relative to the transcoder 202. A captions-to-sentences component may extract these timestamps (e.g., the EBP timestamps) along with the textual Closed Captioning (CEA-608/708) data, which resides in picture user data on the transport stream. Sentence formation is constructed if there is a partial phrase. A series of phrases, which ultimately form a sentence, may be spread over multiple video segments. Multiple video segments may result in more than one shot or scene change.

At 1610, content metadata may be generated comprising the one or more content transitions. The content metadata may comprise one or more program metadata documents. The one or more program metadata documents may comprise textual data extracted from the closed captioning data and one or more shot/scene change times may be reflected as an array of times in the program metadata document.

At 1612, a program transcript may be generated comprising the extracted closed caption data and associated timestamps. Generating the program transcript may comprise may comprise determining a sentence from the closed caption data, determining a timestamp associated with a start of the sentence, and adding the sentence and the timestamp associated with a start of the sentence to the program transcript.

As another example, the content may comprise audio. The audio may be searched to determine speech within the audio. The speech may be broken into a series of phrases or words that may be searched to determine a match based on a query. As a further example, the content may comprise video content. The video content may be searched based on a query. For example, a query may involve a picture of Donald Trump. The video content may then be searched based on the picture to determine whether Donald Trump is shown within the video content. Thus, a query may utilize audio and video content, as well as the closed caption data, to determine a match.

Figure 17:
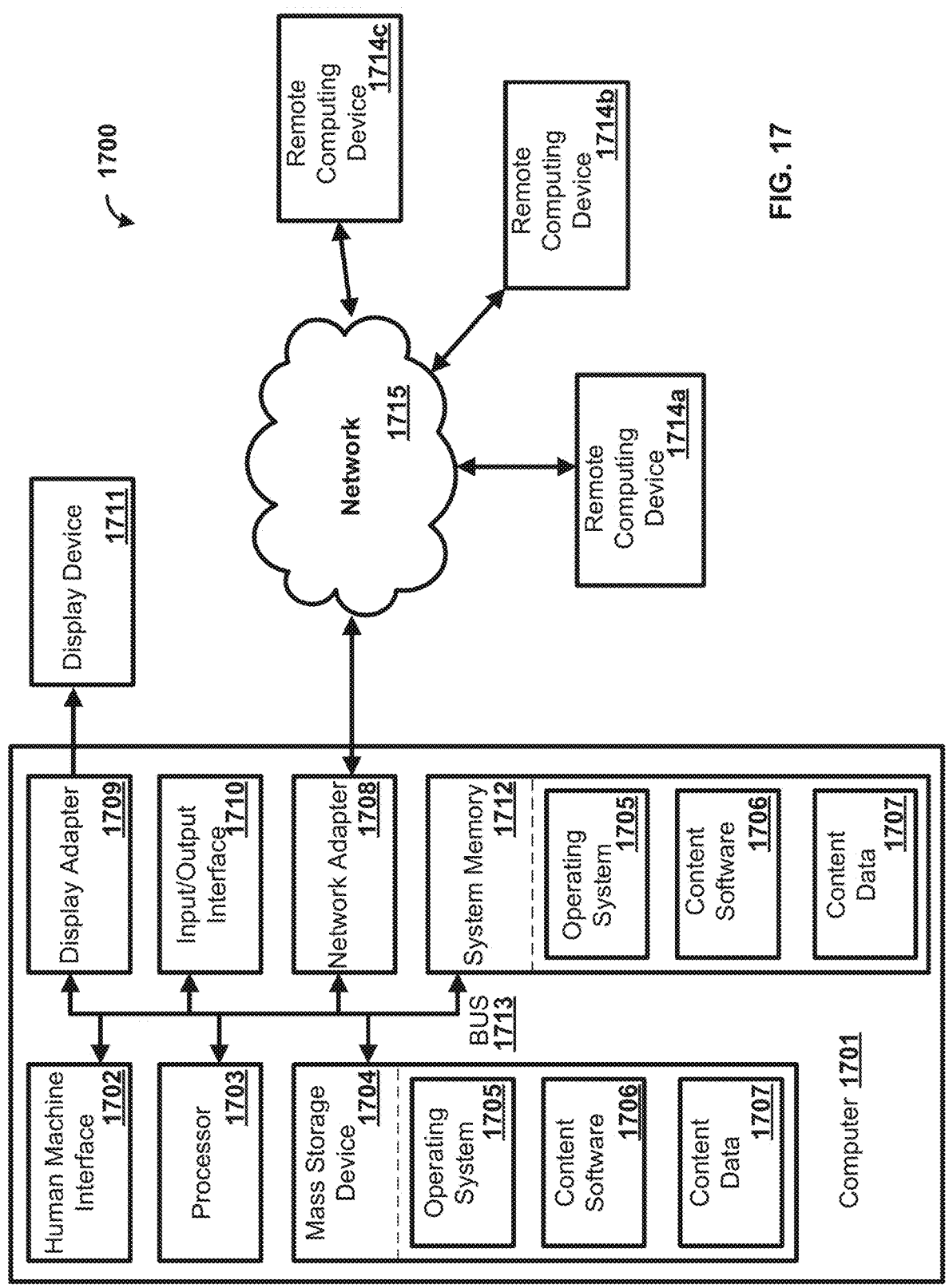
FIG. 17 is a block diagram of an example computing device.

In an example, the methods and systems may be implemented on a computer 1701 as shown in FIG. 17 and described below. By way of example, the edge device 128 of FIG. 1 may be a computer as shown in FIG. 17. Similarly, the methods and systems described herein may utilize one or more computers to perform one or more functions in one or more locations. FIG. 17 is a block diagram showing an example of an operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the described methods and systems may be performed by software components. The systems and methods described herein may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1701. The components of the computer 1701 may comprise, but are not limited to, one or more processors 1703, a system memory 1712, and a system bus 1713 that couples various system components including the one or more processors 1703 to the system memory 1712. The system may utilize parallel computing.

The system bus 1713 represents one or more of several possible types of bus structures, including a memory bus or memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1713, and all buses specified in this description may also be implemented over a wired or wireless network connection and each of the subsystems, including the one or more processors 1703, a mass storage device 1704, an operating system 1705, content software 1706, content data 1707, a network adapter 1708, the system memory 1712, an Input/Output Interface 1710, a display adapter 1709, a display device 1711, and a human machine interface 1702, may be contained within one or more remote computing devices 1714a,b,c at physically separate locations, connected through buses of this form, in effect implementing a fully distributed system.

The computer 1701 typically comprises a variety of computer readable media. Examples of readable media may be any available media that is accessible by the computer 1701 and comprises, for example and not meant to be limiting, both volatile and non-volatile media, removable and non-removable media. The system memory 1712 comprises computer readable media in the form of volatile memory, such as random access memory (RAM), and/or non-volatile memory, such as read only memory (ROM). The system memory 1712 typically contains data such as the content data 1707 and/or program modules such as the operating system 1705 and the content software 1706 that are immediately accessible to and/or are presently operated on by the one or more processors 1703.

In another example, the computer 1701 may also comprise other removable/non-removable, volatile/non-volatile computer storage media. By way of example, FIG. 17 shows an example mass storage device 1704 which may provide non-volatile storage of computer code, computer readable instructions, data structures, program modules, and other data for the computer 1701. For example and not meant to be limiting, the mass storage device 1704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1704, including by way of example, the operating system 1705 and the content software 1706. Each of the operating system 1705 and the content software 1706 (or some combination thereof) may comprise elements of the programming and the content software 1706. The content data 1707 may also be stored on the mass storage device 1704. The content data 1707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another example, the user may enter commands and information into the computer 1701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the one or more processors 1703 via the human machine interface 1702 that is coupled to the system bus 1713, but may be connected by other interface and bus structures, such as a parallel port, game port, an IEEE 1394 Port (also known as a Firewire port), a serial port, or a universal serial bus (USB).

In yet another example, the display device 1711 may also be connected to the system bus 1713 via an interface, such as the display adapter 1709. It is contemplated that the computer 1701 may have more than one display adapter 1709 and the computer 1701 may have more than one display device 1711. For example, the display device 1711 may be a monitor, an LCD (Liquid Crystal Display), or a projector. In addition to the display device 1711, other output peripheral devices may comprise components such as speakers (not shown) and a printer (not shown) which may be connected to the computer 1701 via the Input/Output Interface 1710. Any step and/or result of the methods may be output in any form to an output device. Such output may be any form of visual representation, including, but not limited to, textual, graphical, animation, audio, tactile, and the like. The display device 1711 and computer 1701 may be part of one device, or separate devices.

The computer 1701 may operate in a networked environment using logical connections to one or more remote computing devices 1714a,b,c. By way of example, a remote computing device may be a personal computer, portable computer, smartphone, a server, a router, a network computer, a peer device or other common network node, and so on. Logical connections between the computer 1701 and a remote computing device 1714a,b,c may be made via a network 1715, such as a local area network (LAN) and/or a general wide area network (WAN). Such network connections may be through the network adapter 1708. The network adapter 1708 may be implemented in both wired and wireless environments. Such networking environments are conventional and commonplace in dwellings, offices, enterprise-wide computer networks, intranets, and the Internet.

The application programs and other executable program components such as the operating system 1705 are shown herein as discrete blocks, although it is recognized that such programs and components reside at various times in different storage components of the computing device 1701, and are executed by the one or more processors 1703 of the computer. An implementation of the content software 1706 may be stored on or transmitted across some form of computer readable media. Any of the described methods may be performed by computer readable instructions stored on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Examples of a computer storage media comprise, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A method comprising:
    receiving a query associated with content, the query comprising a first portion and a second portion;
    determining a first match in content metadata for the first portion;
    determining, based on the first match, a start boundary preceding a time associated with the first match;
    determining a second match in the content metadata for the second portion;
    determining, based on the second match, an end boundary following a time associated with the second match; and
    generating, based on the start boundary and the end boundary, a portion of the content.

2. The method of claim 1, wherein the content metadata comprises linear content metadata.

3. The method of claim 1, wherein determining, based on the first match, the start boundary preceding the time associated with the first match comprises:
    determining a time associated with a first duration preceding the time associated with the first match; and
    determining a time associated with a first content transition nearest the time associated with the first duration.

4. The method of claim 1, wherein determining the second match in the content metadata for the second portion comprises determining the second match in linear content metadata received subsequent to the first match.

5. The method of claim 1, wherein determining, based on the second match, the end boundary following the time associated with the second match comprises:
    determining a time associated with a second duration following the time associated with the second match; and
    determining a time associated with a second content transition nearest the time associated with the second duration.

6. The method of claim 1, further comprising sending a notification upon an occurrence of the first match, the second match, extending the start boundary, or extending the end boundary.

7. The method of claim 6, wherein sending the notification upon the occurrence of the first match, the second match, extending the start boundary, or extending the end boundary, comprises sending the notification to a cloud digital video recorder.

8. The method of claim 1, wherein generating, based on the start boundary and the end boundary, the portion of the content comprises extracting the portion of the content as a video clip or storing a content identifier, the start boundary, and the end boundary.

9. A method comprising:
    receiving a query associated with content, the query comprising a first portion and a second portion;
    determining a first match for the first portion in linear content metadata;
    determining, based on the first match, a start boundary preceding a time associated with the first match;
    determining a second match for the second portion in second linear content metadata received subsequent to the first match;
    determining, based on the second match, an end boundary following a time associated with the second match;
    determining a third match for the first portion or the second portion in third linear content metadata received subsequent to the second match;
    extending, based on the third match, the end boundary to a time associated with the third match; and
    generating, based on the start boundary and the end boundary, a portion of the content.

10. The method of claim 9, wherein determining, based on the first match, the start boundary preceding the time associated with the first match comprises:
    determining a time associated with a first duration preceding the time associated with the first match; and
    determining a time associated with a first content transition nearest the time associated with the first duration.

11. The method of claim 9, wherein determining, based on the second match, the end boundary following the time associated with the second match comprises:

determining a time associated with a second duration following the time associated with the second match; and determining a time associated with a second content transition nearest the time associated with the second duration.

12. The method of claim 9, wherein extending, based on the third match, the end boundary to the time associated with the third match comprises:

determining a time associated with a third duration following the time associated with the third match; and determining a time associated with a third content transition nearest the time associated with the third duration.

13. The method of claim 9, further comprising sending a notification upon an occurrence of the first match, the second match, the third match, or a combination thereof.

14. The method of claim 13, wherein sending the notification upon the occurrence of the first match, the second match, the third match or the combination thereof, comprises sending the notification to a cloud digital video recorder.

15. The method of claim 9, wherein generating, based on the start boundary and the end boundary, the portion of the content comprises extracting the portion of the content as a video clip or storing a content identifier, the start boundary, and the end boundary.

16. A method comprising:

receiving a query associated with content, the query comprising a first portion and a second portion;

determining a first part of content metadata that is analogous to the first portion;

determining a start boundary associated with the first part of the content metadata, wherein the start boundary precedes a time associated with the first part of the content metadata;

determining a second part of the content metadata that is analogous to the second portion;

determining an end boundary associated with the second part of the content metadata; and generating, based on the start boundary and the end boundary, a portion of the content.

17. The method of claim 16, wherein the end boundary is after a time associated with the second part of the content metadata.

18. The method of claim 16, wherein the content metadata comprises linear content metadata.

19. The method of claim 18, wherein the second part of the content metadata comprises second linear content metadata received subsequent to determining the first part of the content metadata is analogous to the first portion.

20. The method of claim 16, wherein the first portion of the query comprises a word or phrase and wherein determining the first part of the content metadata that is analogous to the first portion comprises determining, based on the first portion of the query, a second word or phrase in the first part of the content metadata that matches the word or phrase in the first portion of the query.

* * * * *